(12) United States Patent
Clarke et al.

(10) Patent No.: US 7,639,407 B2
(45) Date of Patent: Dec. 29, 2009

(54) SYSTEMS FOR PERFORMING LASER BEAM LINEARITY CORRECTION AND ALGORITHMS AND METHODS FOR GENERATING LINEARITY CORRECTION TABLES FROM DATA STORED IN AN OPTICAL SCANNER

(75) Inventors: Cyrus B. Clarke, Lexington, KY (US); William P. Corbett, Lexington, KY (US); Thomas A. Fields, Winchester, KY (US); Christopher D. Jones, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 1092 days.

(21) Appl. No.: 10/808,130

(22) Filed: Mar. 24, 2004

(65) Prior Publication Data

US 2005/0212905 A1    Sep. 29, 2005

(51) Int. Cl.
H04N 1/04 (2006.01)
(52) U.S. Cl. .................. 358/474; 358/1.9; 358/1.2; 358/1.15; 358/406; 347/132; 347/246; 347/236
(58) Field of Classification Search .............. 358/505, 358/504, 1.9, 475, 509, 474; 382/167, 166; 347/237, 247, 116, 132, 246
See application file for complete search history.

(56) References Cited

U.S. PATENT DOCUMENTS

| | | |
|---|---|---|
| 3,575,505 A | 4/1971 | Parmigianl |
| 4,037,231 A | 7/1977 | Broyles et al. |
| 4,233,612 A | 11/1980 | Hirayama et al. |
| 4,602,383 A | 7/1986 | Ogawa et al. |
| 4,729,617 A | 3/1988 | Shimada et al. |
| 4,757,351 A * | 7/1988 | Birgmeir ................ 355/38 |
| 4,760,251 A | 7/1988 | Shimada et al. |
| 4,860,237 A | 8/1989 | Curry |
| 4,932,732 A | 6/1990 | Nakajima |
| 4,975,626 A | 12/1990 | Yagi et al. |
| 4,978,849 A | 12/1990 | Goddard et al. |
| 5,061,949 A | 10/1991 | Ogino et al. |
| 5,081,477 A | 1/1992 | Gibson |
| 5,117,243 A | 5/1992 | Swanberg et al. |
| 5,134,512 A | 7/1992 | Hiwada |
| 5,164,843 A | 11/1992 | Swanberg |
| 5,175,636 A | 12/1992 | Swanberg |
| 5,181,137 A | 1/1993 | Koide |
| 5,193,013 A | 3/1993 | Swanberg |
| 5,212,570 A | 5/1993 | Nacman |
| 5,272,503 A | 12/1993 | LeSueur et al. |
| 5,331,342 A | 7/1994 | Shimatani et al. |
| 5,477,330 A | 12/1995 | Dorr |
| 5,491,540 A | 2/1996 | Hirst |
| 5,541,637 A | 7/1996 | Ohashi et al. |
| 5,548,321 A | 8/1996 | Murakami et al. |
| 5,585,836 A | 12/1996 | Pham et al. |
| 5,617,132 A | 4/1997 | Fisli |
| 5,719,680 A | 2/1998 | Yoshida et al. |
| 5,742,323 A * | 4/1998 | Fukushima .............. 347/246 |
| 5,751,462 A | 5/1998 | Shiraishi et al. |

(Continued)

*Primary Examiner*—Negussie Worku
(74) *Attorney, Agent, or Firm*—Stevens & Showalter

(57) ABSTRACT

Laser beam scan line nonlinearity is compensated for by providing algorithms for generating linearity profiles which are used by a corresponding registration system in an electrophotographic device to determine the placement of Pels across a scan line.

32 Claims, 11 Drawing Sheets

U.S. PATENT DOCUMENTS

| | | | |
|---|---|---|---|
| 5,754,576 A | 5/1998 | Kusano et al. | |
| 5,764,243 A | 6/1998 | Baldwin | |
| 5,818,507 A | 10/1998 | Genovese | |
| 5,822,105 A | 10/1998 | Kodama et al. | |
| 5,910,651 A | 6/1999 | Ryvkin | |
| 5,933,184 A * | 8/1999 | Ishigami et al. | 347/249 |
| 5,973,574 A | 10/1999 | Markis | |
| 5,980,088 A | 11/1999 | Iwasaki et al. | |
| 5,991,008 A | 11/1999 | Li et al. | |
| 6,023,286 A * | 2/2000 | Nowak et al. | 347/256 |
| 6,037,966 A | 3/2000 | Sakakibara | |
| 6,128,029 A | 10/2000 | Park | |
| 6,157,400 A | 12/2000 | Genovese | |
| 6,175,375 B1 | 1/2001 | Able et al. | |
| 6,178,031 B1 | 1/2001 | Rauch et al. | |
| 6,181,357 B1 | 1/2001 | Hanna | |
| 6,229,555 B1 * | 5/2001 | Hadady et al. | 347/116 |
| 6,285,389 B1 * | 9/2001 | Genovese | 347/250 |
| 6,342,963 B1 | 1/2002 | Yoshino | |
| 6,351,277 B1 | 2/2002 | Skillman | |
| 6,362,847 B1 | 3/2002 | Pawley et al. | |
| 6,363,228 B1 | 3/2002 | Ream | |
| 6,366,307 B1 | 4/2002 | Morrison | |
| 6,373,515 B1 | 4/2002 | Morrison | |
| 6,408,013 B1 | 6/2002 | Akagi et al. | |
| 6,445,404 B1 | 9/2002 | Kerby et al. | |
| 6,486,906 B1 | 11/2002 | Foster et al. | |
| 6,657,650 B1 | 12/2003 | Omelchenko et al. | |
| 6,697,401 B1 | 2/2004 | Schrodinger | |
| 6,747,766 B1 * | 6/2004 | Kamisuwa et al. | 358/505 |
| 6,824,939 B2 * | 11/2004 | Kurimoto et al. | 430/66 |
| 6,891,560 B2 * | 5/2005 | Kwak et al. | 347/246 |
| 7,006,250 B2 * | 2/2006 | Denton et al. | 358/1.9 |
| 7,027,185 B2 * | 4/2006 | Subirada et al. | 358/1.9 |
| 7,079,685 B1 | 7/2006 | Hirota et al. | |
| 7,129,907 B2 * | 10/2006 | Lin et al. | 343/876 |
| 7,349,123 B2 * | 3/2008 | Clarke et al. | 358/1.9 |
| 2001/0017645 A1 | 8/2001 | Toda | |
| 2001/0028387 A1 | 10/2001 | Maeda | |
| 2002/0130792 A1 | 9/2002 | Schaefer | |
| 2004/0213436 A1 * | 10/2004 | Noffke et al. | 382/112 |
| 2005/0212902 A1 | 9/2005 | Cook et al. | |

* cited by examiner

US 7,639,407 B2

SYSTEMS FOR PERFORMING LASER BEAM LINEARITY CORRECTION AND ALGORITHMS AND METHODS FOR GENERATING LINEARITY CORRECTION TABLES FROM DATA STORED IN AN OPTICAL SCANNER

CROSS REFERENCE TO RELATED APPLICATIONS

The present application is related to U.S. Pat. No. 7,206,012 B2 entitled "Memory Device On Optical Scanner And Apparatus And Method For Storing Characterizing Information On The Memory Device"; U.S. Pat. No. 7,349,123 B2 entitled "Algorithms And Methods For Determining Laser Beam Process Direction Position Errors From Data Stored On A Printhead"; and U.S. Pat. No. 7,375,738 B2 entitled "Electronic Systems And Methods For Reducing Laser Beam Process Direction Position Effors"; each of which is filed currently herewith and hereby incorporated by reference herein.

BACKGROUND OF THE INVENTION

The present invention relates to an electrophotographic imaging apparatus, and more particularly to systems and methods for characterizing laser beam process direction position errors.

In electrophotography, a latent image is created on the surface of an electrostatically charged photoconductive drum by exposing select portions of the drum surface to laser light. Essentially, the density of the electrostatic charge on the surface of the drum is altered in areas exposed to a laser beam relative to those areas unexposed to the laser beam. The latent electrostatic image thus created is developed into a visible image by exposing the surface of the drum to toner, which contains pigment components and thermoplastic components. When so exposed, the toner is attracted to the drum surface in a manner that corresponds to the electrostatic density altered by the laser beam. Subsequently, a print medium, such as paper, is given an electrostatic charge opposite that of the toner and is pressed against the drum surface. As the medium passes the drum, the toner is pulled onto the surface thereof in a pattern corresponding to the latent image written to the drum surface. The medium then passes through a fuser that applies heat and pressure thereto. The heat causes constituents including the thermoplastic components of the toner to flow into the interstices between the fibers of the medium and the fuser pressure promotes settling of the toner constituents in these voids. As the toner is cooled, it solidifies and adheres the image to the medium.

In order to produce an accurate representation of an image to be printed, it is necessary for the laser to write to the drum in a scan direction, which is defined by a straight line that is perpendicular to the direction of movement of the print media relative to the drum (the process direction). Moreover, the laser should be capable of writing a line of evenly spaced, print elements (Pels) on the surface of the drum. However, manufacturing tolerances, imperfections of optical devices in the optical system, and the inherent configuration of the printhead cause imperfections in the spacing between written Pels along a scan line, which is referred to herein as scan line nonlinearity. Particularly, the velocity of the laser beam varies across the scan line, which typically causes consecutive Pels to be written farther apart near the ends of the scan line, and closer together near the middle portion of the scan line.

The prior art has attempted to compensate for scan line nonlinearity by providing carefully aligned and calibrated optics. For example, it is known to use an f-theta lens in the optical system of a printhead to optically modify the laser beam scan path to attempt to achieve a more constant linear velocity. However, the increased precision required by the optical elements adds significantly to the cost of the printhead. Even with precisely manufactured and aligned optics, the degree to which laser beam scan linearity may be corrected is limited by several factors, including component tolerances. Moreover, nonlinearity of laser beam scan velocity can occur even in precisely calibrated optical systems due to component aging and/or operational influences such as temperature changes.

SUMMARY OF THE INVENTION

The present invention overcomes the disadvantages of the prior art by providing algorithms for generating linearity profiles which are used by a corresponding registration system in an electrophotographic device to determine the placement of Pels across a scan line to compensate for laser beam velocity nonlinearity.

According to a first embodiment of the present invention, a laser beam scan line velocity linearity registration system comprises a pel clock generator, a pel clock counter and a linearity table. The pel clock generator is programmably configured to generate pel clock pulses based upon correction values input thereto. The pel clock counter is communicably coupled to the pel clock generator and is operatively configured to determine a count value corresponding to a count of pel clock pulses. The linearity table, which has a plurality of correction values stored therein, is communicably coupled to the pel clock counter and the pel clock generator such that an associated one of the correction values is selected from the linearity table based upon the count value from the pel clock counter and is communicated to the pel clock generator, wherein a duration of a corresponding pel clock pulse is derived from the correction value.

According to another embodiment of the present invention, a method of computing a linearity profile to compensate for scan line velocity nonlinearity in an electrophotographic device comprises obtaining a plurality of measurements of a laser beam, and assigning first and second insertion times. For a plurality of Pel locations along the scan path, an ideal Pel location is identified. A first postulated position is computed based upon the first insertion time and select ones of the plurality of measurements and second postulated position is computed based upon the second insertion time and select ones of the plurality of measurements. A correction value is then stored corresponding to a select one of the first and second postulated positions that is closest to the ideal Pel location.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

General System Overview

Figure 1:
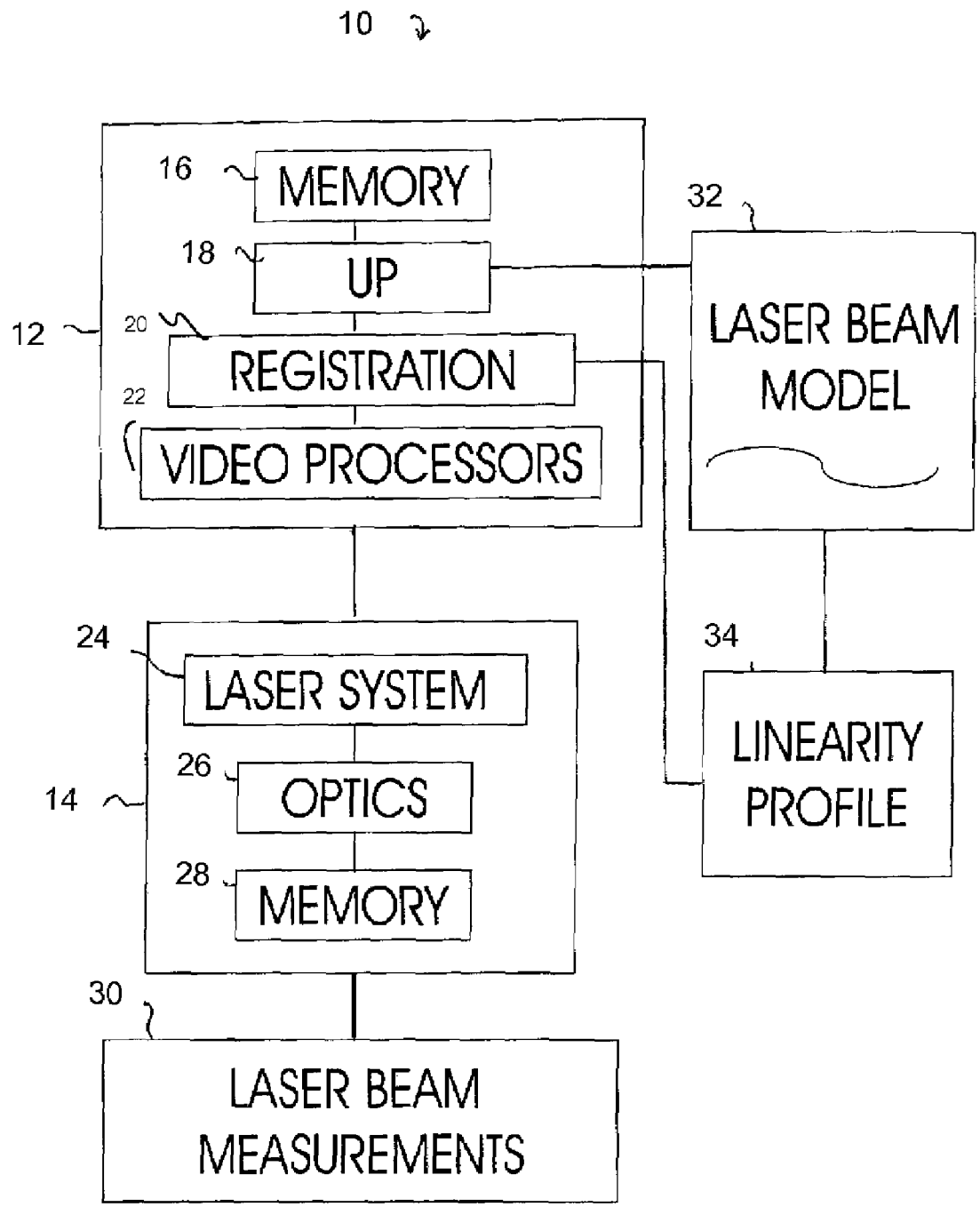
FIG. 1 is a block diagram of a system for computing linearity profiles according to the present invention.

FIG. 1 illustrates the main components of a system 10 for generating linearity profiles that are used to compensate for scan line velocity changes in an electrophotographic device according to the present invention. The system 10 includes generally, a controller 12 and a printhead 14. The controller 12 includes the electronics and logic necessary for performing electrophotographic imaging including the performance of operations necessary to characterize laser beam scan line velocity nonlinearity as set out in greater detail herein. As shown, the controller 12 includes system memory 16, a microprocessor 18, one or more registration systems 20 and one or more video processors 22. The printhead 14 includes a laser system 24, an optical system 26 and a memory device 28. If implemented in a color device, the system 10 may include four video processors 22, one video processor 22 for each of the cyan, yellow, magenta and black image planes. Each video processor 22 may have associated therewith, a corresponding registration system 20 in the controller 12 and a laser in the laser system 24 of the printhead 14.

Prior to initiating a printing operation, the microprocessor 18 reads a plurality of laser beam position measurements 30 from the memory device 28 on the printhead 14 and derives therefrom, a laser beam scan path model 32 for each laser beam in the laser system 24. Each laser beam scan path model 32 generally describes or models the scan path of the corresponding laser beam as it moves across a corresponding photoconductive drum. Each laser beam scan path model 32 is used to derive a corresponding scan line linearity profile 34, which is used by the associated registration system 20 to supply scan line corrections to its corresponding video processor 22.

Briefly, an image to be printed is temporarily stored in the system memory 16. For color printing, the image is deconstructed into four bitmaps corresponding to the cyan, yellow, magenta and black (CYMK) image planes. The microprocessor 18 then initiates a printing operation whereby each color image plane bitmap is processed by its corresponding video processor 22, which converts the bitmap image data into a plurality of Pels in the form of a signal suitable for modulating the corresponding laser in the printhead 14. Each video processor 22 receives timing information for writing their plurality of Pels from the associated registration system 20. Correspondingly, each registration system 20 derives timing information based upon their corresponding scan line linearity profile 34 so that inherent laser beam scan line velocity changes are generally compensated.

Laser Beam Scan Path Test Points

Figure 2:
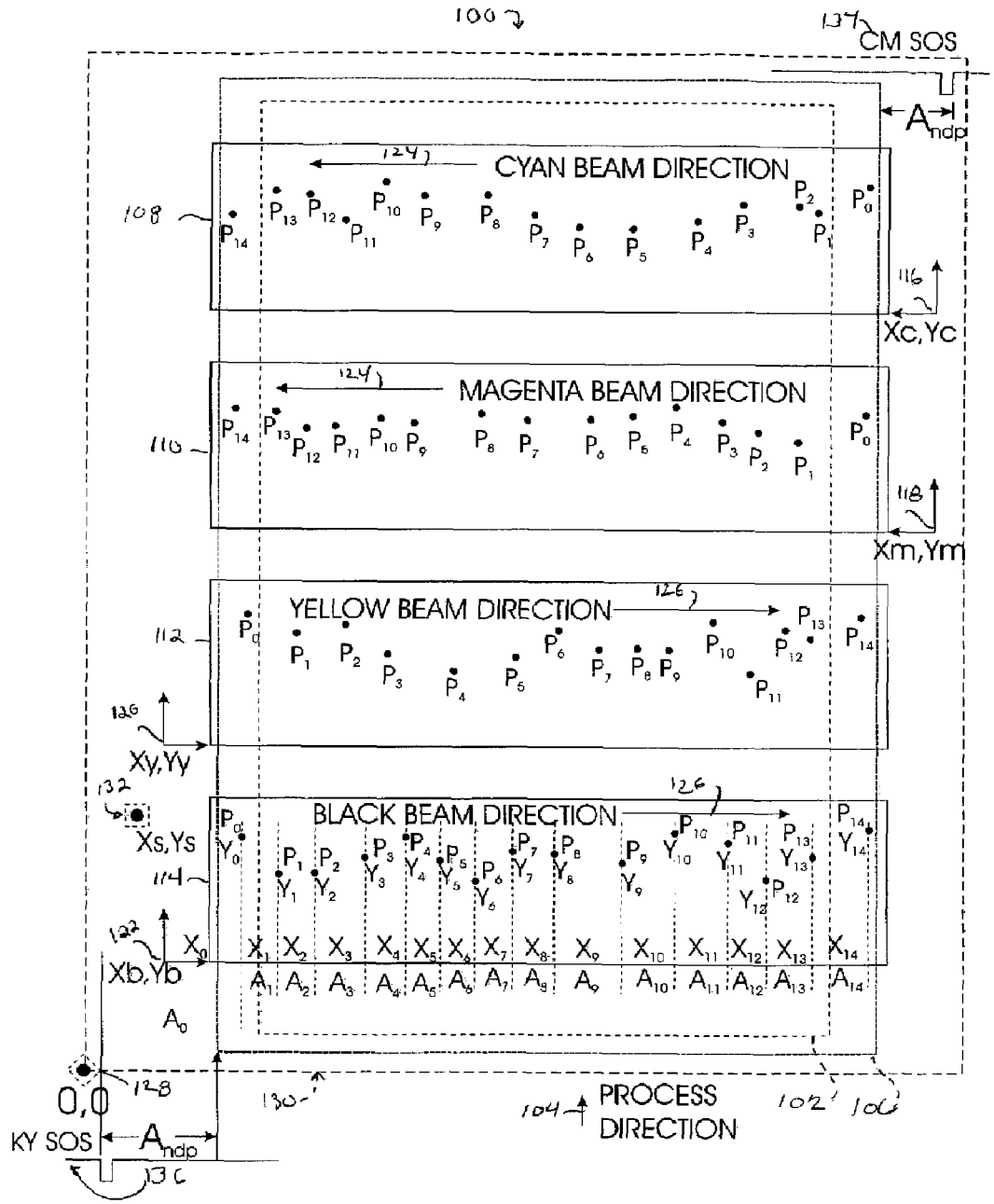
FIG. 2 is a schematic view of a laser scanning system from the perspective of a printhead looking onto a print medium.

In order to derive each scan line linearity profile 34, the microprocessor 18 determines a measure of the laser beam scan line velocity changes from laser beam measurements 30, which, in the illustrated embodiment, are stored on a memory device 28 of the printhead 14. To clarify the context in which the laser beam measurements 30 are taken in the current embodiment, FIG. 2 illustrates a schematic representation of a laser system 24 from the perspective of the printhead 14 looking onto a print medium. The laser scanning system is similar to the one described in greater detail in U.S. Pat. No. 7,349,123 B2 entitled "Algorithms And Methods For Determining Laser Beam Process Direction Position Errors From Data Stored On A Printhead"; which is already incorporated by reference herein.

Typically, each laser beam of the printhead 14 writes to a corresponding photoconductive drum. However, for purposes of clarifying the principles of the current embodiment of the present invention, FIG. 2 assumes that each laser writes directly to a print medium (indicated by the dashed box 102) instead of its corresponding photoconductive drum. The print medium 102 is assumed to move up the page in a process direction, as illustrated by the directional arrow 104. Notably, the width of the print medium 102, e.g., a typical sheet of letter-sized paper, is less than the maximum writeable area of the corresponding laser beams as indicated by the dashed box 106.

The ideal scan path for each laser beam is a straight line that is transverse to the process direction 104, thus across the page as shown. However, each laser beam is likely to exhibit process direction position errors including bow and skew. As such, a cyan scan plane 108, a magenta scan plane 110, a yellow scan plane 112 and a black scan plane 114 are illustrated to represent an example scan path for each associated laser beam. To frame the laser beam position measurements into a meaningful context for processing, each scan plane 108, 110, 112, 114 is associated with a corresponding, arbitrarily positioned, local beam position origin 116, 118, 120 and 122.

The beam position origins 116, 118, 120, 122 are provided for convenience and allow scan path measurements taken in each corresponding scan plane 108, 110, 112, 114 to be referenced relative to a local coordinate system. It may be convenient to select a position for each of the beam position origins 116, 118, 120, 122 in a manner that minimizes or eliminates the need to store and manipulate negative numbers. For example, by selecting the beam position origin 116, 118, 120, 122 to be located before the first test point measured relative to the scan direction, i.e., the direction of travel of the corresponding laser beam, all of the scan direction measurements (X-axis measurements) will be positive. As shown, the cyan and magenta laser beams traverse generally in a first scan direction 124, illustrated as traversing across the page from the right to the left. The yellow and black laser beams traverse generally in a second scan direction 126 across the page from the left to the right, which is opposite of the first scan direction 124.

Figure 3:
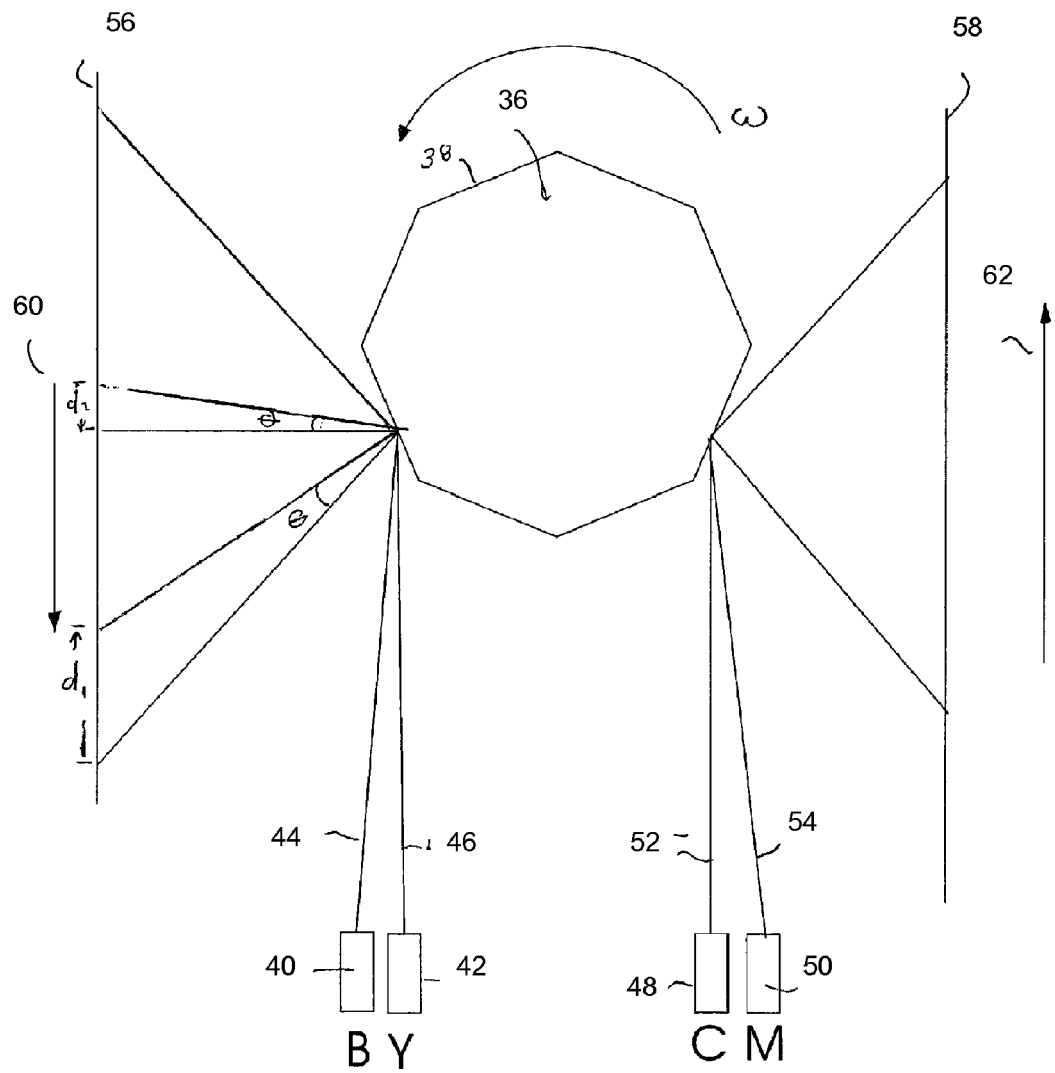
FIG. 3 is a schematic representation of the relationship between the four lasers in the printhead, and the rotating polygonal mirror.

These scan direction orientations correspond to the manner in which the corresponding laser beam impinges the rotating polygon mirror as illustrated in FIG. 3. Referring thereto, a rotating polygonal mirror 36 in the optical system 26 includes a plurality of facets 38 thereon, and is operatively configured to rotate at a fixed rotational velocity (w). The laser system 24 includes a first laser 40 and a second laser 42 that are positioned in proximity to one another. Each of the first and second lasers 40, 42 emits a corresponding laser beam 44, 46 so as to impinge upon the same one of the facets 38 of the polygonal mirror 36. The laser system 24 also includes a third laser 48 and a fourth laser 50 that are positioned in proximity to one another and in spaced relation to the first and second lasers 40, 42. The third and fourth lasers 48, 50 each emit a corresponding laser beam 52, 54 so as to impinge upon the same one of the facets 38 of the polygonal mirror 36, which is different from the facet 38 impinged by the first and second beams 44, 46.

As the polygonal mirror 36 rotates, the angle of each laser beam 44, 46, 52, 54 with respect to a particular facet 38 impinged thereby, changes causing each laser beam 44, 46, 52, 54 to sweep in a corresponding scan plane in the direction of rotation of the polygonal mirror 36. The first and second laser beams 44, 46 reflect off of the rotating polygonal mirror 38 and strike a first fold down mirror 56 that directs each of the first and second beams 44, 46 through the laser beam optical system 26 so as to scan across their corresponding photoconductive drums (not shown). Correspondingly, the third and fourth laser beams 52, 54 reflect off of the rotating polygonal mirror 38 and strike a second fold down mirror 58 that directs each of the third and fourth beams 52, 54 through the laser beam optical system 26 so as to scan across their corresponding photoconductive drums (not shown). Accordingly, it can be observed that the first and second laser beams 44, 46 will sweep generally in a first scan direction as indicated by the first directional arrow 60 that is generally opposite of the second scan direction of the third and fourth beams 52, 54 as indicated by the second directional arrow 62.

Due to the placement of the rotating polygonal mirror 36 and the first and second fold down mirrors 56, 58 with respect to each of the lasers 40, 42, 48 and 50, it can be observed that the velocity of corresponding laser beams 44, 46, 52, 54 will vary across their scan paths. Particularly, the velocity of each laser beam will be generally greater at the edges of each scan line, and relatively slower near the center of the scan line.

This is seen because the distance between the corresponding point on the mirror 36 from which each laser beam is reflected and the associated fold down mirror 56, 58 is greater at the edges of the corresponding scan line than generally within the middle of the scan line. For example, as illustrated in FIG. 3, a change in the angle (designated θ) of each laser beam 44, 46 generally at the beginning of each scan line causes a corresponding sweep across the first fold down mirror 56 in the first scan direction 60 by a distance of d1. When each laser beam 44, 46 rotates through the same angle (θ) generally towards the middle of the scan line, the corresponding laser beams 44, 46 travel a distance of d2. Notably, d1 is greater than d2 as can be easily derived from standard geometry. As such, given a constant rotational velocity of the rotating polygonal mirror 36, if each video processor 22 transmits Pels to their corresponding laser in the printhead 14 at a fixed frequency, the corresponding written Pels will not be evenly spaced due to the laser beam velocity nonlinearity and the resultant printed image will appear distorted. Scan line velocity nonlinearity may be further affected by the unavoidable imprecision in the shape and mounting of the polygonal mirror 36 and various mirrors and lenses in the optical system 26.

Referring back to FIG. 2, a plurality of test points, e.g., fifteen test points, labeled $P_0$-$P_{14}$ as shown, are detected at various locations across each scan plane 108, 110, 112, 114. Measurements taken of these test points $P_0$-$P_{14}$, are stored on the memory device 28 in the printhead 14 for each scan plane 108, 110, 112, 114 and may be recorded at any time, e.g., during assembly prior to the printhead 14 being installed within a printer. The number of test points and the interval(s) upon which the test points are taken can vary depending upon the application.

For purposes of clarity, the remainder of the discussion herein will be directed primarily towards a discussion of the black scan plane 114. However, the discussion applies analogously to the cyan, magenta and yellow scan planes 108, 110, 112 with notable differences identified.

The measurements for the test point $P_0$ are expressed as Cartesian X, Y coordinates, where $X_0$ represents the distance that test point $P_0$ lies from the black beam position origin 122 in the scan direction 126 and $Y_0$ represents the distance that test point $P_0$ lies from the black beam position origin 122 in the process direction 104. Any suitable unit of measure, e.g., microns, millimeters, etc. may be used to record the measurement. The scan direction (X-axis) measurements for the remainder of the test points $P_1$-$P_{14}$, are taken relative to the preceding test point. For example, the measurement recorded for test point $P_1$ in the scan direction 126 is the distance in the scan direction 126 that test point $P_1$ lies from the test point $P_0$, etc. This approach allows the size of each measurement to be kept relatively small, and reduces the amount of space necessary to store the measurements in a memory device. Alternatively, each test points $P_1$-$P_{14}$ may be expressed relative to the black beam position origin 122.

The beam position measurements for each of the scan planes 108, 110, 112, 114 may be taken at some time during manufacturing of the apparatus and are stored in a memory device 28, e.g., a nonvolatile ram (NVRAM) device on the printhead 14, accessible to the microprocessor 18 in the controller 12. An exemplary approach to measuring points along a laser beam scan path is set out in U.S. Pat. No. 7,206,012 B2 entitled "Memory Device On Optical Scanner And Apparatus And Method For Storing Characterizing Information On The Memory Device" to the same assignee, the contents of which are already incorporated by reference herein.

It may be desirable to describe the location of each of the beam position origins with respect to an arbitrary image system origin 128. As shown, an image system plane 130 (illustrated by the dashed box) encompasses each of the cyan, magenta, yellow and black scan planes 108, 110, 112, 114. The image system plane 130 thus defines a global coordinate system relative to each of the local coordinate systems for each corresponding scan plane 108, 110, 112, 114. The image system origin 128 thus allows each test point $P_0$-$P_{14}$ of each scan plane 108, 110, 112, 114 to be described in a global coordinate system.

Again, the location of the image system origin 128 can be completely arbitrary. However, it may be convenient to select the location of the image system origin 128 to eliminate the need to process negative numbers. As shown, for convenience the image system origin 128 is located in the lower left hand corner. The scan direction is designated along the X-axis, with positive values to the right of the origin. The process direction is designated along the Y-axis, with positive values above the origin. The coordinates of the cyan beam position origin 116 with respect to the image system origin 128 is Xc,Yc. The coordinates of the magenta beam position origin 118 with respect to the image system origin 128 is Xm,Ym. Similarly, the coordinates of the yellow beam position origin 120 with respect to the image system origin 128 is Xy,Yy, and the coordinates of the black beam position origin 122 with respect to the image system origin 128 is Xb,Yb.

A correlation is also established between the printhead 14 and each of the scan planes 108, 110, 112, 114 by defining a printhead origin, i.e., a known, fixed point arbitrarily selected in the printhead. For convenience, the printhead datum is selected, e.g., a datum location on a printhead housing. However, any other position may alternatively be used. As shown, the printhead datum is projected down onto the page to define a printhead origin 132, which is located at coordinates Xs,Ys with respect to the image system origin 128. Based upon the above, it can be seen that the beam position measurements (test points $P_0$-$P_{14}$) from each of the scan planes 108, 110, 112, 114 can now be freely mapped between their respective local coordinate systems, to a system based relative to the printhead. Also, it should be noted that the use of the beam position origins 116, 118, 120, 122 are for convenience and are implemented to reduce the necessary storage requirements of the beam position measurements 30. The beam position measurements may alternatively be stored relative to the printhead datum or other known reference location.

The Laser Beam Scan Path Model

Based upon the process and scan direction beam position measurements (X,Y) of the test points $P_0$-$P_{14}$ for a given scan plane 108, 110, 112, 114, it is possible to construct a corresponding laser beam scan path model 32 that characterizes the scan path of the corresponding laser beam. However, knowledge of the laser beam scan path alone is not always sufficient to be able to correspond a particular Pel in a bitmap image to be printed, to a position along the scan path. This is because the location of a written Pel along a scan path may be affected by a number of factors including printer registration data and laser beam scan velocity fluctuations. A linearity profile 34 is derived from the corresponding laser beam scan path model 32 so as to compensate for the laser beam scan velocity fluctuations.

An exemplary approach to correspond a test point location $P_0$-$P_{14}$ to a particular written Pel location is to measure the scan direction position of each of the above described test points $P_0$-$P_{14}$ as a function of the angular position of the rotating polygonal mirror. A single start-of-scan signal 134 is provided for the laser beams corresponding to the cyan and magenta scan planes 108, 110, which is designated herein as CM SOS. Correspondingly, a single start-of-scan signal 136 is provided for the laser beams corresponding to the yellow and black scan planes 112, 114, which is designated herein as KY SOS.

With reference to the black scan plane 114, a predetermined amount of time after detecting the start-of-scan signal 136, i.e., when a detect-to-print time has expired, a detect-to-print signal is provided. The detect-to-print signal indicates that the laser beam associated with the black scan plane 114 has reached a position corresponding to the first edge of a print medium, which is designated Pel 0 (not shown in FIG. 2). Each scan plane 108, 110, 112, 114 may have associated therewith, a unique detect-to-print time, designated herein generally as $DetToPrint_{(time)}$. As will be discussed more explicitly below, the detect-to-print time $DetToPrint_{(time)}$ corresponding to each scan plane is a function of an associated nominal detect-to-print time $DetToPrint_{(nominal)}$ as modified by registration data stored in the device, which is used to derive a corresponding offset $DetToPrint_{(offset)}$.

It may be convenient to store each nominal detect-to-print time $DetToPrint_{(nominal)}$, and correspondingly, the nominal location of Pel 0, as an angle measurement ($A_{ndp}$) with respect to a known, fixed point, e.g., the corresponding start of scan sensor and an inherently known location of the laser beam when it actuates the start of scan sensor.

Thus:

$$A_{ndp} = \omega_{polygonalmirror} \times DetToPrint_{(nominal)}$$

where $\omega_{polygonalmirror}$ is the rotational velocity of the polygonal mirror 36.

In a similar fashion, an angle $A_0$ corresponds to an angular change of the rotating polygonal mirror as the laser beam corresponding to the black scan plane 114 crosses the first test point $P_0$ relative to its angular position at the start-of-scan signal 136. The angles $A_1$-$A_{14}$ are similarly measured, but are recorded relative to the preceding measurement to reduce storage requirements. That is, $A_1$ is the change in the angle of the rotating polygonal mirror relative to $A_0$, etc. Alternatively, each angle may be recorded relative to the start-of-scan signal 136 or other known reference. The angles $A_0$-$A_{14}$ thus each correspond to a time value that relates to the time between the start-of-scan signal 136 and the associated scan direction position of the corresponding test point $P_0$-$P_{14}$.

The angles discussed herein may be measured as is set out in U.S. Pat. No. 7,206,012 B2 entitled "Memory Device On Optical Scanner And Apparatus And Method For Storing Characterizing Information On The Memory Device" to the same assignee, the contents of which are already incorporated by reference herein.

It should be noted that the first beam position measurement, e.g., test point $P_0$, does not necessarily correspond to the Pel 0 location, i.e., the location where the first Pel that fits onto a physical page. Similarly, the last beam position measurement, e.g., test point $P_{14}$, does not necessarily need to correspond to the last Pel that can be written to a particular print medium, i.e., the last Pel that can be written to a physical page along a scan line.

Beam Position Measurement Data

The process direction measurements (plotted on the Y-axis as shown in FIG. 2) are useful for computing a bow profile for performing process direction position errors as set out in detail in U.S. Pat. No. 7,349,123 B2 entitled "Algorithms And Methods For Determining Laser Beam Process Direction Position Errors From Data Stored On A Printhead", which is already incorporated by reference herein.

For purposes of the present invention, only the scan direction (X-axis) and the angle measurements will be considered. Table 1, below, is merely illustrative of the manner in which the beam position measurements may be stored in the printhead memory device 28 in the illustrated embodiment. As can be seen in the table below, each color image plane 108, 110, 112, 114 includes entries that identify the coordinates of the corresponding local beam position origin 116, 118, 120, 122 relative to the image system origin 128 and corresponding beam position measurements (X and A for each corresponding test point $P_0$-$P_{14}$). The scan direction (X-axis) measurements for each of the test points $P_0$-$P_{14}$ for each color scan plane 108, 110, 112, 114 are encoded into two byte values, and the fifteen corresponding X-axis values for each scan plane 108, 110, 112, 114 are concatenated into a single, 30 byte vector. A similar encoding scheme is applied likewise to the Angle measurements. The table also stores the rotating polygonal mirror angular position $A_{ndp}$ corresponding to the nominal detect-to-print time for each scan plane and the printhead origin coordinates as an offset from the image system origin.

TABLE 1

Printhead Memory Allocation Table

| Name | Units | Size | Description |
|---|---|---|---|
| Xc | microns | 4 | X Offset from image system origin to cyan coordinate system |
| Yc | microns | 4 | Y Offset from image system origin to cyan coordinate system |
| Cyan X Vector | microns | 30 | Delta X vector for cyan wrt cyan beam position origin |
| Cyan A Vector | Δ degrees | 30 | Delta angle vector for cyan wrt to SOS |
| Cyan Nominal DetPrt | Δ degrees | 2 | Nominal DetPrt wrt to SOS in degrees*8192 |
| Ym | microns | 4 | Y Offset from image system origin to magenta coordinate system |
| Magenta X Vector | microns | 30 | Delta X vector for magenta wrt magenta beam position origin |
| Magenta Y Vector | microns | 30 | Y vector for magenta wrt magenta beam position origin |
| Magenta A Vector | Δ degrees | 30 | Delta angle vector for magenta wrt to SOS. |
| Magenta Nominal DetPrt | Δ degrees | 2 | Nominal DetPrt wrt to SOS in degrees*8192 |
| Xy | microns | 4 | X Offset from image system origin to yellow coordinate system |
| Yy | microns | 4 | Y Offset from image system origin to yellow coordinate system |
| Yellow X Vector | microns | 30 | Delta X vector for yellow wrt yellow beam position origin. |
| Yellow A Vector | Δ degrees | 30 | Delta angle vector for yellow wrt to SOS. |
| Yellow Nominal DetPrt | Δ degrees | 2 | Nominal DetPrt wrt to SOS in degrees*8192 |
| Xb | microns | 4 | X Offset from image system origin to black coordinate system |
| Yb | microns | 4 | from image system origin to black coordinate system |
| Black X Vector | microns | 30 | Delta X vector for black wrt black beam position origin |
| Black A Vector | Δ degrees | 30 | Delta angle vector for black wrt to SOS. |
| Black Nominal DetPrt | Δ degrees | 2 | Nominal DetPrt wrt to SOS in degrees*8192 |
| Xs | uM | 2 | Printhead origin offset from Image System origin |
| Ys | uM | 2 | Printhead origin offset from Image System origin |
| CM SOS to EOS | ns | 4 | Cyan/Magenta SOS to EOS |
| KY SOS to EOS | ns | 4 | Black/Yellow SOS to EOS |

Building the Laser Beam Scan Path Models in Memory

Figure 4:
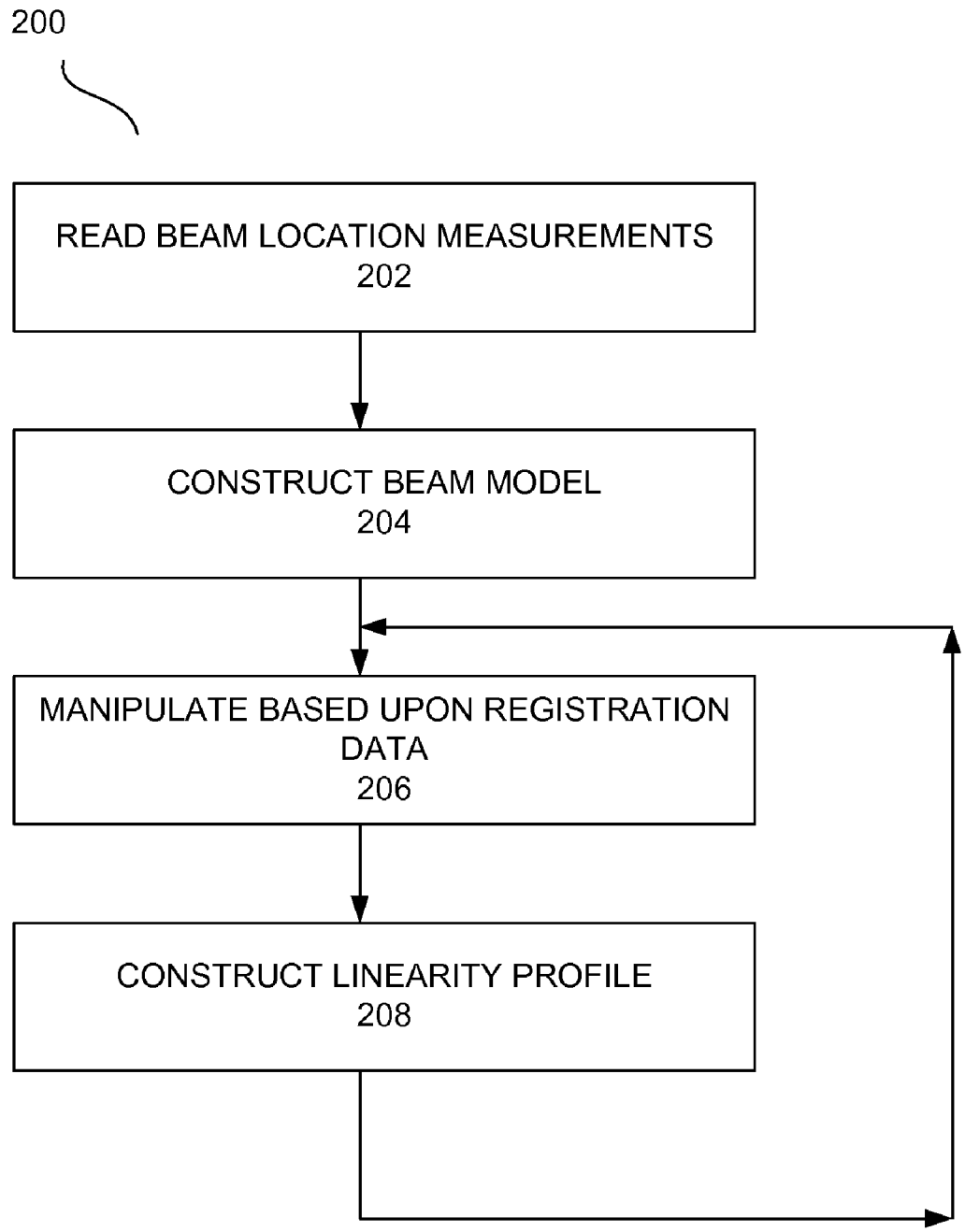
FIG. 4 is a flow chart of a method for generating linearity profiles according to the present invention.

Referring to FIG. 4, a flow chart illustrates a method 200 for constructing a scan line linearity profile from laser beam position measurements. The method may be implemented for example, by software instructions executed on the microprocessor 18 in the controller 12 and may be repeated for each color scan plane 108, 110, 112, 114.

Initially and in the illustrated embodiment, the corresponding beam position measurements are read from the memory device 28 at 202. A laser beam scan path model 32 is constructed for each scan plane from the corresponding laser beam position measurements 30 at 204. At this stage, each laser beam scan path model 32 may comprise a set of scan direction coordinates for a plurality of test points with respect to the printhead origin 132 (e.g., the printhead datum) and corresponding angle measurements that define the rotating polygonal mirror angle for each of the test points with respect to an angular position of the mirror 36 when the start-of-scan origin is generated. Next, each laser beam scan path model 32 is optionally manipulated, e.g., scaled according to registration data at 206 or drift correction data. A linearity profile 34 may then be derived from each laser beam scan path model 32 at 208. Each linearity profile describes a compensation for the velocity changes of a corresponding laser beam as the beam traverses an associated scan plane. The method 200 loops back to step 206 as needed to change the corresponding linearity profile 34, such as to account for temperature variation or margin/line length registration. For example, by detecting a change in the timing between associated start of scan and end of scan signals, a temperature change in the device may be inferred, and changes may be implemented to the associated linearity profile 34 to account for temperature induced laser beam drift.

Creating a Laser Beam Scan Path Model

The laser beam position measurements may be stored in the memory device 28 as a set of measurements relative to their respective local beam position origins 116, 118, 120, 122. Each laser beam scan path model is constructed by mapping the data stored in the memory device 28 to an image system having the printhead as the origin. This process can be accomplished because the memory device 30 also stores the coordinates of each local beam position origin 116, 118, 120, 122 and the coordinates of the printhead origin 128 relative to the image system origin 128. Accordingly, two arrays may be dimensioned for each laser beam, designated herein as Angle [ ] and X_vector_wrt_printhead[ ], all of size n (n=15 test points in the example of FIG. 2).

The angle array Angle[ ] is populated with the angle measurements for a given scan plane. The first angle value $A_0$ is read out from the memory device 28. Depending upon how the angle measurement was recorded, it may be necessary to scale the angle read from the memory device 30. For example, a scanner angle may be measured to within several decimal places of accuracy. In order to avoid storing angles with their fractions, a scaling may optionally be provided to the measurement before being stored in memory. For example, each measured angle may be multiplied by an integer that is at least as large in magnitude as the number of decimals of precision of the angle measurement being scaled to convert that angle to an integer.

For example, a hypothetical angle measurement of 5.612 degrees can be scaled by an integer greater than, or equal to 1000 (corresponding to three decimal places of precision). In one exemplary application, each angle measurement is scaled (multiplied) by 8192. As such, when reading the angle measurements out from the memory device 28, the first angle value $A_0$ is adjusted to remove the scaling factor by dividing the value $A_0$ by 8192 (or what ever value was used to scale the angle measurements), and the results of the computation are stored in the Angle array. That is, Angle[0]=$A_0$/8192. The remaining fourteen angles $A_1$-$A_{14}$, stored in the memory device 28 are treated as offsets from the first angle Angle[0] and are derived by reading out an angle values, converting the angle, e.g., dividing the corresponding value by the scaling factor, e.g., 8192, and adding it to the previous angle at 310. For example, Angle[1]=$A_1$/8192+A[0]; Angle[2]=$A_2$/8192+ A[1] etc. This generalizes to:

$$\text{Angle}[k]=A_k/8192+\text{Angle}[k-1]$$

where 1<=k<=n−1 and n=total number of entries in the array. Additional or alternative manipulations of the angles may also be implemented.

As noted above, in the illustrated embodiment, the scan beam position measurements (X) for each of the sets of test points $P_0$-$P_{14}$ are stored in the memory device 28 relative to their local scan plane origin 116, 118, 120, 122. However, to construct a corresponding laser beam scan path model 32, the scan direction position measurements (X-axis values) must be expressed with respect to the printhead origin 132. The first X measurement ($X_0$) for the black scan plane 114 is read and is converted to a measurement relative to the printhead origin as follows:

$$x\_vector\_wrt\_printhead[0]=X_0+Xb-Xs;$$

Because the remainder of the X measurements for the black scan plane 114 are offsets relative to the previous measurement, subsequent X measurements are converted to an offset measurement relative to the printhead origin 132 by adding the current offset to the previously computed value.

$$x\_vector\_wrt\_printhead[k]=x\_vector\_wrt\_printhead[k-1]+X_k;$$

where 1<=k<=n−1. Notably, because the remainder of the test points $X_1$-$X_{14}$ are offsets, only the first test point $X_0$ needs to be mapped to the printhead origin.

The above equations apply similarly for the yellow scan plane 12. That is, $$x\_vector\_wrt\_printhead[0]=X_0+Xy-Xs;$$

$$X\_vector\_wrt\_printhead[k]=X\_vector\_wrt\_ph\_printhead[k-1]+X_k;$$

where 1<=k<=n−1.

However, for the cyan and magenta beams, the computations must be modified because the laser scan direction 124 corresponding to those beams is opposite that of the scan direction 126 corresponding to the yellow and black laser beams as noted above. That is, for the cyan scan plane 108:

$$x\_vector\_wrt\_printhead[0]=-1*X_0+Xc-Xs;$$

$$X\_vector\_wrt\_printhead[k]=X\_vector\_wrt\_printhead[k-1]-X_k;$$

And for the magenta scan plane 110:

$$X\_vector\_wrt\_printhead[0]=-1*X_0+Xm-Xs;$$

$$X\_vector\_wrt\_printhead[k]=X\_vector\_wrt\_printhead[k-1]-X_k;$$

where 1<=k<=n−1.

Upon completing the above calculations, the data points for each color plane define a laser beam scan path model 32 that describes the corresponding laser beam scan path as a plurality of rotating polygonal mirror angles as a function of their corresponding scan direction (X-axis) position measurements.

Laser Beam Model Adjustments

The laser beam position measurements 30, noted above, may be taken prior to the printhead 14 being installed in a corresponding printer, and assume a predetermined line length for each scan line. However, margin errors of one or more laser beams may result after installation of the printhead 14 in the printer. So as to detect any adjustments that are necessary to a line length and/or a margin location, a user or technician can perform registration diagnostics and provide correction adjustments thereto, to compensate for registration offsets of one or more laser beams. For example, a test page may be printed and analyzed to detect whether margin location and/or line length adjustments are necessary. An operator can then provide adjustments, such as by entering correction values into an operator panel on the device. In response, a first margin may be adjusted by varying the detect-to-print time while a second margin may be adjusted by varying the length of the scan line. To compensate for such adjustments, the corresponding laser beam scan path model may be modified.

Margin Correction of the Beam Profile in Memory

In the electrophotographic device, a user or technician can perform registration diagnostics and provide correction adjustments thereto, to adjust the margins of one or more laser beams. For example, a test page may be printed and analyzed to determine whether the margins are properly calibrated. An operator can then provide adjustments, such as by entering correction values into a front panel on the device. To compensate for such adjustments, the corresponding laser beam scan path model must be modified, such as by magnification thereof and/or adjustment to the detect-to-print time. For example, a positive offset value entered into a first margin registration data may indicate an earlier starting of a scan line, i.e., the position of Pel 0 is moved closer to the corresponding edge a printed page and a negative offset value may indicate a later starting of a scan line. Further, a positive offset value entered into second margin registration data may indicate a lengthening of the scan line, and a negative value may indicate a shortening of the scan line relative to its previous value. As an example, each unit entry of second margin correction data may correspond to an adjustment in terms of a number of Pels at a given resolution.

Figure 5:
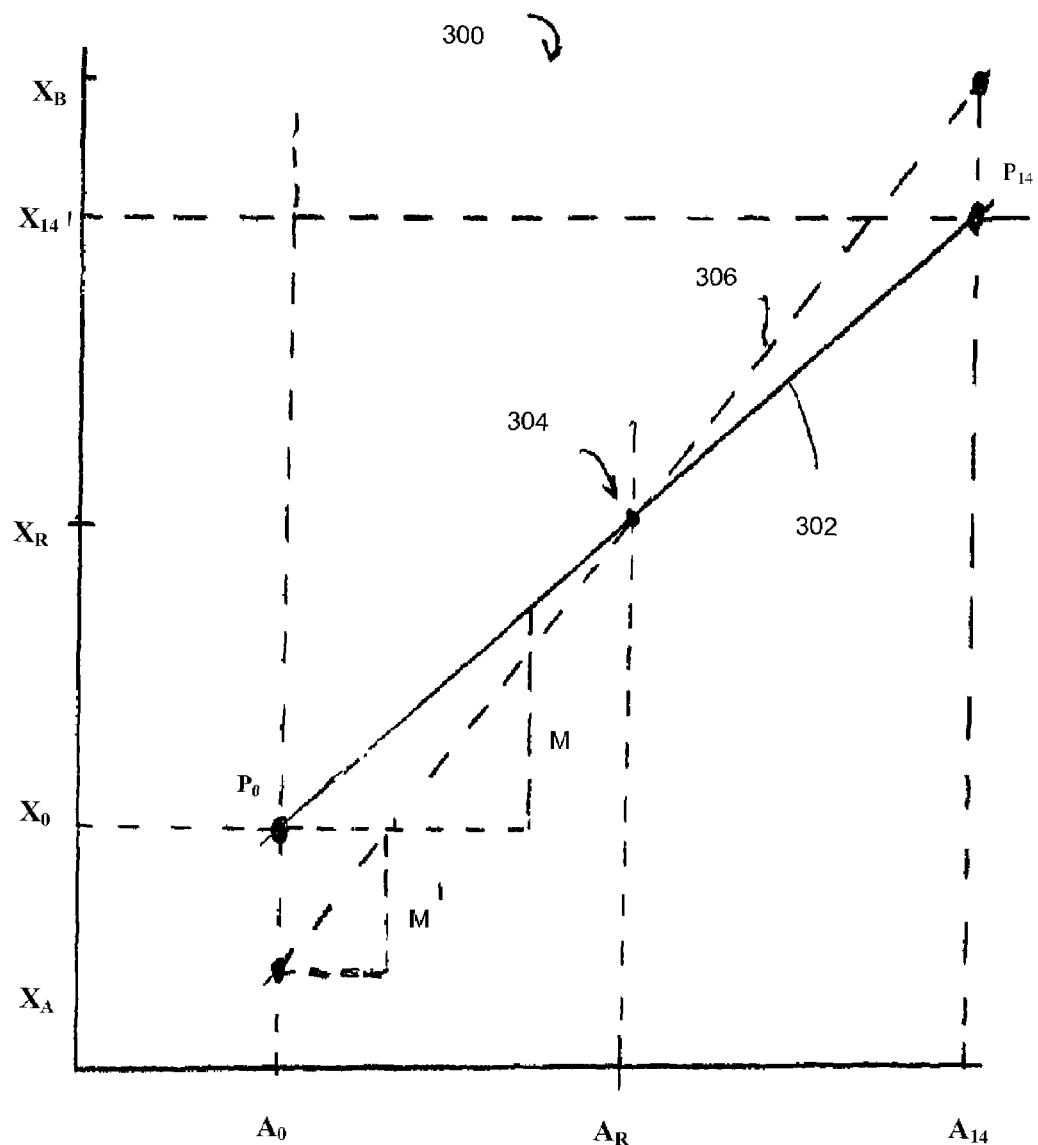
FIG. 5 is a chart depicting a method of performing right margin adjustments according to the present invention.

Referring to FIG. 5, to conceptualize rotation of a scan line to compensate for a second margin adjustment, i.e., to vary the length of a scan line, a plot 300 is made of scan beam or polygonal mirror angle versus scan direction position. For this rotation, the corresponding laser beam is assumed to be linear by constructing a line between two points along the laser beam scan path to define an original line segment 302. The midpoint 304 of the original line segment 302 is located, and the original line segment 302 is rotated thereabout to define a rotated line segment 306. The amount of rotation is derived from the second margin correction data entered into the operator control panel on the corresponding electrophotographic device. When the original line segment 302 is properly rotated as described in greater detail below, each laser beam angle measurement is unchanged. However, a new set of scan direction values are determined for each corresponding rotating polygonal mirror angle in the corresponding laser beam scan path model 32.

For example, test points $P_0$ and $P_{14}$ may be selected for convenience. Of course any other locations may alternatively be selected. The two selected points, e.g., $P_0$ and $P_{14}$, may be plotted using their values taken from the corresponding laser beam scan path model 32. As illustrated, the points $P_0$ and $P_{14}$ are plotted as (Angle[0], X_vector_wrt_printhead[0]) and (Angle[14], X_vector_wrt_printhead[14]).

To perform the rotation, a value is computed that reflects a percentage of change in the line length of the rotated line segment 306 relative to the original line segment 302. Once that percentage of change is known, an adjustment can be applied to all of the measurements in the corresponding laser beam scan path model 32. To determine the percentage of change, the slope of the corresponding original line segment 302 is computed as:

$$m = \frac{(X\_wrt\_print\ head[14] - X\_wrt\_print\ head[0])}{Angle[14] - Angle[0]}$$

where X_vector_wrt_printhead[14]−X_vector_wrt_printhead[0] represents the scan direction length of the original line segment 302 and can be denoted ORIGINAL_LENGTH.

The slope of the rotated line segment 306 is computed as:

$$m' = \frac{(X_B - X_A)}{Angle[14] - Angle[0]}$$

where $X_B - X_A$ represents the scan direction length of the rotated line segment 306 and can be denoted ROTATED_LENGTH.

It can be seen that the percentage change in the scan direction can be computed by dividing the ROTATED_LENGTH by the ORIGINAL_LENGTH. One way to express the percentage change in scan direction is computed as:

$$\frac{m}{m'} = \frac{\frac{(X\_wrt\_print\ head[14] - X\_wrt\_print\ head[0])}{Angle[14] - Angle[0]}}{\frac{(X_B - X_A)}{Angle[14] - Angle[0]}}$$

$$\frac{m}{m'} = \frac{ORIGINAL\_LENGTH}{ROTATED\_LENGTH}$$

$$m' = m\frac{ROTATED\_LENGTH}{ORIGINAL\_LENGTH}$$

It can be seen that the expression:

$$\frac{ROTATED\_LENGTH}{ORIGINAL\_LENGTH}$$

represents the percent change in the desired scan direction length. For convenience, let:

$$k_m = \frac{ROTATED\_LENGTH}{ORIGINAL\_LENGTH}$$

$$m' = mk_m$$

The rotation to be performed modifies each scan direction measurement X_vector_wrt_printhead[k] without changing its corresponding angle Angle[k] for 0<=k<=n−1.

In general terms, the angle at the point of rotation, i.e., the midpoint 304, is designated Ar, and is computed as:

$$A_R = \frac{(Angle[14] - Angle[0])}{2} + Angle[0]$$

The corresponding midpoint 304 along the scan direction is designated $X_R$. It can be seen based upon the above, that an alternative way to express the slope of the rotated line segment 306 in general terms for any one of the points k in the corresponding laser beam scan path model is:

$$m' = \frac{X_R - X\_wrt\_print\ head[k]}{A_R - Angle[k]}$$

Let the expression $mk_m(A_R - Angle[k])$ be denoted l, then:

$$m' = \frac{l}{A_R - Angle[k]}$$

$$l = m'(A_R - Angle[k])$$

$$l = mk_m(A_R - Angle[k])$$

thus:

X_wrt_print head[k]$_{rotated}$ = $X_R - l$

X_wrt_print head[k]$_{rotated}$ = $X_R - m'(A_R - Angle[k])$

X_wrt_print head[k]$_{rotated}$ = $X_R - mk_m(A_R - Angle[k])$

Now that a generalized equation is known for the rotation, the data entered from the operator control panel for the associated scan plane is read to determine a corresponding slope m' for the rotated line segment 306. In the above example, each unit of line length change corresponds to a predetermined number of Pels at a given resolution. To increase the margin/lengthen the line:

$$k_m = 1 + \text{Units}\left(\frac{NumberOfPels}{Resolution}\right)$$

Correspondingly, to decrease the margin/shorten the line:

$$k_m = 1 - \text{Units}\left(\frac{NumberOfPels}{Resolution}\right)$$

To increase the margin/lengthen the line:

$$X\_wrt\_printhead[k]_{rotated} = m\left(1 + \text{Units}\left(\frac{NumberOfPels}{Resolution}\right)\right)(A_R - \text{Angle}[k])$$

Correspondingly, to decrease the margin/shorten the line:

$$X\_wrt\_printhead[k]_{rotated} = m\left(1 - \text{Units}\left(\frac{NumberOfPels}{Resolution}\right)\right)(A_R - \text{Angle}[k])$$

Assume as an example, that an adjustment value entered into the operator control panel corresponds to a desired adjustment of two Pels at 600 dpi relative to the current line length. Assuming a letter sized page, there are 5,100 Pels per line at 600 dpi. Assume an operator enters 3 units of correction into the operator panel. Then each X_wrt_printhead[k] is modified by the expression:

$$X\_wrt\_printhead[k]_{rotated} = m\left(1 - 3\left(\frac{2Pels}{600dpi}\right)\right)(A_R - \text{Angle}[k])$$

Of course, the units of $c_m$ may need to be converted to the corresponding unit of measure for the X_wrt_printhead[k] variables. For example, assume that X_wrt_printhead[k] is expressed in microns. Then the above formula is expressed as:

$$X\_wrt\_printhead[k]_{rotated} =$$
$$m\left(1 - 3\left(\frac{2Pels}{600\,Pels/in} \times 25.4\,\frac{mm}{in} \times 1000\,\frac{microns}{mm}\right)\right)(A_R - \text{Angle}[k])$$

Of course, other ways of performing line length rotation are possible. For example, the y-axis may comprise the scan direction measurement expressed in Pels instead of measurements in microns. Also, the rotation may points other than $P_0$ and $P_{14}$. For example, the rotation can be performed using Pel 0 and $Pel_m$.

Video Signal Representation

Figure 6:
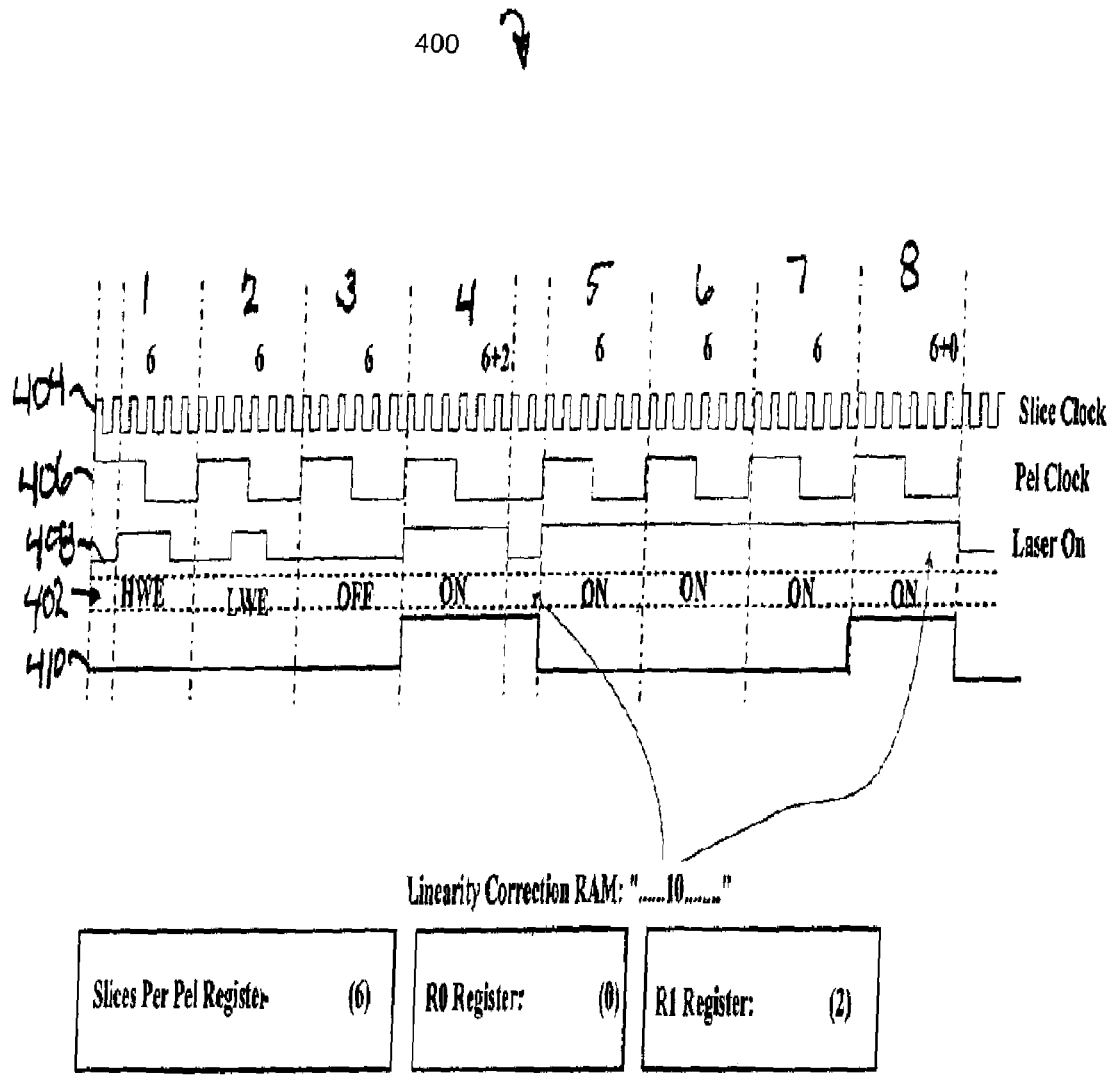
FIG. 6 is a timing diagram of an exemplary modulated laser signal according to the present invention.

Referring to the timing diagram 400 of FIG. 6, three signals are used by each video processor 22 to derive a laser signal which is communicated to the corresponding laser system 24. The laser system 24 uses the corresponding laser signal to modulate the associated laser beam to write a scan line of Pels. A first signal (video signal) 402 is an encoded signal that has been derived from the bitmap image data read from the memory 16, and is thus schematically represented on the timing diagram using the labels OFF, LWE, HWE, and ON as will be described below. Briefly, each pixel of bitmap image data is encoded into a plurality of video "slices", which together define a corresponding Pel along the associated scan line. If the pixel of the bitmap image is turned on, e.g., has a value of 1, then each slice defining a Pel corresponding to that pixel of bitmap image data will also be turned on, e.g., assigned the value of 1. In an analogous manner, if the pixel of the bitmap image data is turned off, e.g., has the value of 0, then each slice defining a Pel corresponding to that pixel of bitmap image data will also be turned off, e.g., have the value of 0. The number of slices per Pel is arbitrary.

Alternatively, each slice in a given Pel corresponding to an associated pixel of bitmap image data can be individually turned on or off, thus each Pel may be assigned a "weight" in the scan line written by the laser. For example, each pixel of bitmap image data may be encoded into an m-slice video signal that encodes p-possible weights for an associated pixel of bitmap image data. In the exemplary embodiment of FIG. 6, m is set to six and p is set to 4 thus each bitmap pixel is encoded as a six-slice signal having one of four possible weights. Of course, other combinations are possible. An exemplary six-slice encoding comprises the sequence "111111" for an "ON" pixel at full weight. The sequence "011110" may encode an "ON" pixel at a high weight energy (HWE). The sequence "001100" may encode an "ON" pixel at a low weight energy (LWE) and the sequence "000000" may encode an "OFF" pixel. As such, the first signal 402 is designated by its corresponding weight, e.g., ON, HWE, LWE, or OFF.

The second signal (slice clock) 404 is a clocking signal. The slice clock 404 is a fixed frequency clock that defines the duration of each slice of each Pel, and thus defines the duration of each Pel. That is, when a select laser in the laser system 24 is instructed to write a pixel of bitmap image data, that laser will write to the corresponding photoconductive drum (not shown) a corresponding sequence of m laser pulses where each pulse is triggered by the next successive active edge of the slice clock. The third signal (Pel clock) 406 used by the video processors 22 is a second clocking signal. The Pel clock 406 instructs the corresponding video processor 22 when to start serially transmitting the next m-slice sequence to the associated laser system 24. Each video processor 22 uses the corresponding video signal 402 and the slice clock and Pel clocks 404, and 406 to derive a fourth signal (laser output) 408, which is communicated to the printhead 14.

The duration of each slice is controlled by the fixed frequency slice clock 404, and the Pel clock 406 is used to control the spacing between Pels, i.e., the timing of when each written Pel (m-slice sequence) is communicated to the corresponding laser system 24. The term "written Pel" as used herein, encompasses both on and off Pels, and thus includes for example, any one of a full on Pel, high weight energy Pel, low weight energy Pel, or an off Pel. This system thus allows control over where each Pel is placed along the scan line, and makes the duration of laser on time for each Pel along a scan line generally independent of the Pel clock. For illustrative purposes, the timing diagram of FIG. 6 shows a sequence of eight Pels written by a select laser of the laser system 24. Written Pel 1 has a high weight energy, written Pel 2 has a low weight energy, written Pel 3 is off, and written Pels 4-8 are all full on Pels.

In the embodiment illustrated in FIG. 6, the active edge of the slice clock 404 can occur on either the low-to-high edge or the high-to-low edge, thus the slice clock is a dual edge clock. The use of dual edged clocks is optional. However, the use of dual edge slice clock allows the video processor 22 greater flexibility when preparing the video signal 408. For example, the video processor may center justify the on laser pulses in the center of a given m-slice sequence of a Pel. In the six-slice sequence of Pel 1 (high weight energy pulse 011110), the laser signal may actually be turned on three "half-slices" into the six-slice sequence as noted by the laser signal 408 going high on the third half pulse of the slice clock 404. The laser signal is kept on for the next six half-slices, and is turned off for three half-slices. Of course, the period in which the laser signal is turned on for any given m-slice Pel can alternatively be left justified, right justified, or otherwise distributed across the m-slices. Also, more or less than four weights may be assigned. Further, each weight may have other allocation of on and off laser signal durations. Still further, although the above example utilized a dual edge clock, such is not required to practice the present invention.

Figure 7:
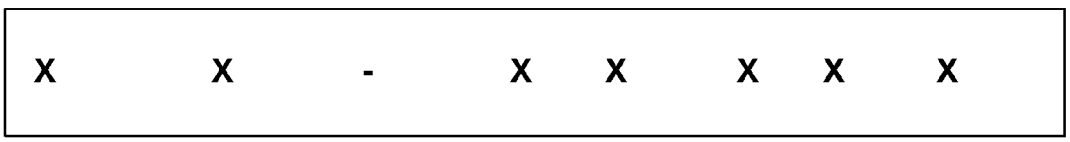
FIG. 7 is a schematic representation of the modulated laser signal of FIG. 6 without linearity compensation.

Referring to FIG. 7, the line of written Pels illustrated in the timing diagram of FIG. 6 is schematically illustrated without any linearity correction and assumes that the bitmap image data is written at a fixed frequency. As shown, the large X indicates the ON Pels (Pels 4-8), the medium sized X represents the high weight Pel (Pel 1), the small X represents the low weight Pel (Pel 2) and the dash (-) represents the OFF Pel (Pel 3). As schematically illustrated, the distance between written Pels 4 and 5 is not evenly spaced relative to the remainder of the written Pels due to scan line velocity nonlinearity.

Figure 8:
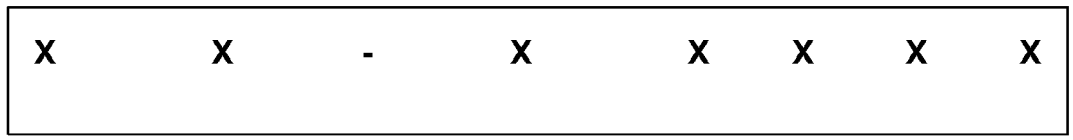
FIG. 8 is a schematic representation of the modulated laser signal of FIG. 6 with linearity compensation.

Referring briefly back to FIG. 6, the registration system 20 attempts to compensate for scan line nonlinearity by "nudging" select ones of the written Pels so as to more evenly divide the written Pels across the scan line. The written Pels are "nudged" by adding one or more additional slice clock pulses between consecutive active edges of the Pel clock 406. For example, as shown, the spacing between each active edge of the Pel clock 406 is six slice clock pulses, e.g., each Pel clock pulse comprises six slice clock pulses. However, two additional slice clock pulses are added between the active edges of Pel clock pulses 4 and 5 so that the Pel clock pulse corresponding to written Pel 4 has a period of 8 slice clock pulses instead of six. Referring briefly now to FIG. 8, the same Pels of FIGS. 6 and 7 are illustrated, this time with linearity correction according to the timing diagram of FIG. 6. Notably, as illustrated, the additional two slice clocks between the active edges of Pel clock pulses 4 and 5 have the effect of more evenly spacing the written Pels across the scan line.

The Linearity Correction Hardware

Figure 9:
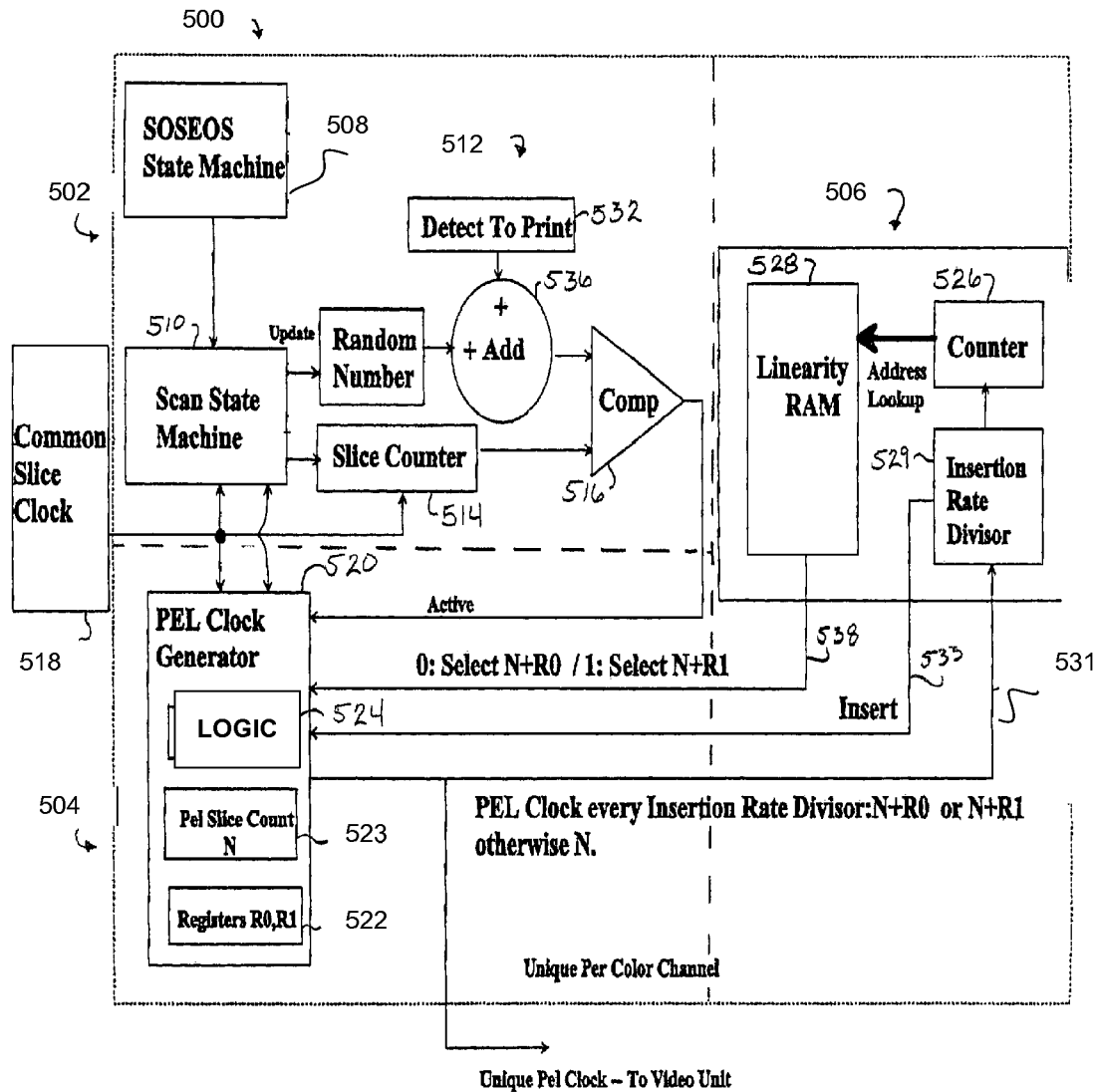
FIG. 9 is a block diagram of a linearity correction registration system according to the present invention.

Referring to FIG. 9, a schematic diagram illustrates a registration system 500 that comprises one embodiment of the registration system 20 illustrated in FIG. 1. For a color device, there would be four registration systems 500, one for each color image plane. The registration system 500 comprises generally, three sections including a scan line registration section 502, a Pel clock generation section 504, and a linearity correction section 506. The scan line registration section 502 is responsible for identifying the start time for writing a scan line of image data. The Pel clock generation section 504 derives the Pel clock signal that informs the corresponding video processor 22 when to start writing the next Pel from the current line of image data to the associated laser in the laser system 24. The linearity correction section 506 determines whether a slice clock insertion is to occur and/or the number of slice clock insertions that are to occur when deriving the Pel clock signal as will be explained in greater detail below.

The scan line registration section 502 includes start of scan/end of scan detection logic 508, scan state logic 510, delay logic 512, a slice counter 514 and a comparator 516. Additionally, the scan line registration section 502 receives input from a common slice clock 518 and from the Pel clock generation section 504.

The Pel clock generation section 504 includes a Pel clock generator 520, first and second count registers 522, a Pel slice count register 523 and count selection logic 524. The Pel clock generator 520 receives input from the scan line registration section 502, from the common slice clock 518, and from the linearity correction section 506.

The linearity correction section 506 includes a Pel counter 526, a linearity correction table 528 and insertion rate logic 529. The linearity correction section 506 receives input 531, i.e., Pel clock pulses from the Pel clock generation section 504, and produces a first output 533 from the insertion rate logic 529 and a second output 538 from the correction table 528. Both the first and second outputs 533, 538 are communicated back to the Pel clock generator section 504. The first output 533 informs the count selection logic 524 when to read the data on the second output 538 from the correction table 528 for performing slice insertions.

Registration System Operation

When a corresponding start of scan (SOS) sensor on the printhead 14 indicates a laser strike, the start of scan/end of scan detection logic 508 picks up the signal and informs the scan state logic 510 that a new scan line is about to be written. In response thereto, the scan state logic 510 sends a signal triggering the delay logic 512. The delay logic 512 determines how much time the system should wait after receiving the SOS signal before beginning the process of writing a scan line of data.

In one illustrative embodiment, the printhead 14 comprises first and second start-of-scan (SOS) sensors (not shown). The first SOS sensor generates a start-of-scan signal upon detecting a laser beam strike from a designated one of the black and yellow laser beams and the second SOS sensor generates a start-of-scan signal upon detecting a laser beam strike from a designated one of the cyan and magenta laser beams. Moreover, there are four registration systems 500, one registration system 500 associated with each of the cyan, yellow, magenta and black image planes. Accordingly, the start of scan/end of scan detection logic 508 of the registration systems 500 corresponding to the yellow and black image systems are operatively configured to detect the first SOS signal. Analogously, the start of scan/end of scan detection logic 508 of the registration systems 500 corresponding to the cyan and magenta image systems are operatively configured to detect the second SOS signal. Other start of scan sensor arrangements may alternatively be implemented however. For example, a single start of scan signal may be used for all four color image planes and corresponding registration systems 500, or each color image plane and corresponding registration system 500 may have associated therewith, a unique start of scan sensor.

As shown, the delay time is derived from two inputs. A detect to print time is stored in a detect to print register 532. Also, a random number is generated from a random number generator 534. The detect-to-print time (DTP time$_{(nominal+offset)}$) is a value that is derived from the nominal detect-to-print time DetToPrint$_{(nominal)}$ (shown in FIG. 2 as an angle measurement $A_{ndp}$) plus modifications thereto via registration data as explained above. The detect to print register is thus set according to the following formulas:

$$DetToPrint_{(time)} = A_{ndp}(\text{degrees}) * \frac{(\text{rev})}{360\ (\text{degrees})} * \frac{1\ (\text{min})}{\omega_{polygonalmirror}\ (\text{rev})} * \frac{60\ (\text{sec})}{1\ (\text{min})}$$

where $\omega_{polygonalmirror}$ is the angular velocity of the rotating polygonal mirror.

The approach used to convert the offset will depend upon how the offset is stored. For example, an offset may be represented by a signed integer (so that the location of Pel 0 can be adjusted to the left or right) where each increment (+ or −) corresponds to a given number of Pel locations per value at a specified resolution. For example, one increment of offset may be defined as four Pel locations at 600 dpi. This example is converted to time by the following formula:

$$Offset_{(time)} = OffsetValue * PelsPerValue * \frac{CurrentResolution}{OffsetResolution} * SubClocksPerPel * TimePerClock$$

As an example, assume that the stored Offset value is +1, each offset represents 4 Pels at 600 dpi and the print resolution is currently set at 1200 dpi, so the pels per value of offset must be scaled accordingly. To scale 600 dpi to 1200 dpi, the offset is doubled. Also, in the above example, assume that there are six sub or slice clocks per Pel and the time for each clock is τ. This corresponds to 1*4*1200/600*6*τ or an offset in of 48τ where τ is the period of a clock cycle.

This angle can be converted to time as follows:

$$DTPtime_{(nominal+offset)} = DetectToPrint_{(time)} + Offset_{(time)}$$

The value required to load into the detect-to-print register 532 may also be expressed as a function of the slice clock.

$$DTPtime_{(slice\text{-}clock\ pulses)} = DTPtime_{(nominal+offset)}/\text{Slice Clock (count/seconds)}$$

The delay is also a function of a random number derived from the random number generator 534 that is updated by the scan state machine 510 after receiving a start of scan signal from the start of scan logic 508. The random number generator 534 is optional and may be used to add a random delay time number, e.g., in units of slice clock pulses, to the DTP-time$_{(slice\text{-}clock\ pulses)}$ to randomly vary the start of each scan line. The random number generator 534 may use masks or other techniques to limit the range of the random delay generated. A summing processor 536 adds the value of the detect to print register 532 and the random delay time number from the random number generator 534 to derive the unique time delay for a corresponding scan line.

When the corresponding SOS signal is triggered, the scan state machine 510 also resets the slice counter 514, which subsequently begins counting slice clocks from the slice clock 518. When the slice counter 514 has counted to a value equal to the value computed by the summing processor 536, the comparator 516 triggers an ACTIVE signal that is communicated to the Pel clock generator section 504, which starts the Pel clock generator 520 producing Pel clock pulses. The slice counter 514 may optionally include a rate divisor or other process to update the slice counter 514 in integer multiples of the common slice clock 518. For example, the slice counter 514 may update its count on every other slice clock pulse.

The Pel counter 526 keeps track of a count of Pels along a scan line at a predetermined resolution. Thus the Pel counter 526 generally tracks the position of a corresponding laser beam along the associated scan line. The Pel counter 526 outputs the current Pel count or a corresponding address to the linearity table 528. The linearity table 528, which may be implemented for example, as a RAM, stores a correction value for select Pel positions along the scan line. These correction values are communicated as the correction output 538 to the count selection logic 524. The count selection logic 524 uses the correction output 538 to determine the number of slices to be inserted into the nominal Pel clock signal.

In one illustrative example, the number of slice clock pulses comprising a nominal Pel clock, designated herein as N, is derived from the Pel slice count register 523. This register may optionally be updated depending upon the print output resolution. For example, the Pel slice count register 523 may store the value six for 2,400 dpi output, the value twelve for 1,200 dpi output, and the value twenty four for 600 dpi output. As such, a given Pel written along a scan line may comprise six, twelve or twenty four slice clock pulses depending upon the print output resolution. Of course, the Pel slice count could alternatively be a fixed size or based upon any other number of slices.

By inserting slices at the correct time in the scan, each written Pel is placed with minimal error. Accordingly, some logic is required to figure out how to best place these "slice clock insertions" into the Pel clock so as to minimize the error in the location of written Pels. The first and second registers 522 determine how many slice clock pulse insertions are to be made to the nominal pel clock signal N if an insertion is to be made. In the illustrated embodiment, a non-negative integer (thus including 0) is represented by the data stored in each of the first and second count registers 522, designated R0 and R1 respectively. However, the first and second registers 522 could alternatively store signed values. It is noted that depending upon the particular implementation, the data stored in the first and second registers 522 may be an encoded value that corresponds to the desired number of slice insertions. As such, the time between two written Pels is N slice clock pulses if no slice insertion is performed, N+0 if a slice insertion is performed and register R0 is selected, and N+2 if a slice insertion is performed and register R1 is selected.

The value of the correction output 538 communicated from the linearity correction table 528 is a single bit of information. The count selection logic 524 of the Pel clock generation section 504 reads the one-bit output 538 from the linearity table to decide whether to select either the first or second register 522 if a slice insertion is to occur. In practice, the correction output 538 could be greater than one bit, and the Pel clock generator 504 could correspondingly have more than two count registers 522 so that a greater variety of timing options are available.

If the value of the correction output 538 corresponding to the current Pel position is 0, then a Pel clock pulse of N plus the number of insertions encoded into R0 is generated by the Pel clock generation section 504. Correspondingly, if the value of the correction output 538 is 1, a Pel clock pulse of N plus the number of insertions encoded into R1 is generated by the Pel clock generation section 504.

Modifying the Print Resolution

Referring back to the timing diagram shown in FIG. 6, there are six slices per written Pel as shown in the example.

Register R0 contains the value that corresponds to zero slice insertions, and register R1 contains the value that corresponds to two slice insertions. Registers R0 and R1 may correspond to the first and second registers 522 discussed with reference to FIG. 9. It is assumed that the linearity correction table, such as the correction table 528 in FIG. 9, was created for the 600 dpi case, and the illustrated timing diagram illustrates data written at 2400 dpi. As such, a slice insertion from either R0 or R1 will occur on every fourth written Pel. By performing an insertion on every fourth Pel, it can be seen that the 600 dpi correction values will space evenly across the 2400 dpi scan line.

A linearity profile corresponds to the data stored in the linearity correction table 528. For purposes of illustration, it is presumed that a linearity profile comprises the sequence of . . . 10 . . . If it is assumed that the value "1" in the linearity profile sequence occurs at Pel 4, then the value "0" occurs at Pel 8. The value of "1" in the exemplary linearity profile triggers the use of Register R1 in determining the number of slice clocks in that Pel clock. Continuing with the above examples, if R1 represents the value of 2, and there are six slices for a written Pel, then Pel 4 will still comprise six slice clocks, but there will be two slices of delay between Pel 4 and Pel 5. The nominal slice register N is set to 6 so the Pel clock for Pel 4 is set to a duration of eight slice clocks. Note however, that the addition of two slice clocks into the Pel clock did not affect the duration of Pel 4, which was written as a six slice sequence. Now, considering Pel 8, it can be seen that register R0 is selected, thus the nominal Pel clock is adjusted by 0 Pels, i.e., the Pel period remains six slice clocks (N+0).

Referring back to FIG. 9, the optional insertion rate divisor 529 is used to determine when a slice insertion is to occur. In the above exemplary embodiment of the present invention, the linearity correction table 528 is established at 600 dpi of resolution. As such, if the printer output is 600 dpi, there is one bit of correction data for every Pel of output. However, if the print output set to 1,200 dpi, then either the amount of data in the linearity correction ram is matched accordingly to the print output resolution, or alternatively, correction can still be established at 600 dpi resolution. In such a case, the insertion rate divisor 529 is programmed to update the counter 526 in integer multiples, e.g., every two, Pel pulses. Correspondingly, the insertion rate divisor 529 will signal the Pel clock generator 520 via the first output 533 when an insertion is to occur. Thus when the first output 533 goes active, the clock insertion logic 524 knows to read the output of the correction table 528 via the second output 538. The clock insertion logic 524 uses the value of the second output signal 538 to select between the first and second registers 522 for the slice insertion time for that Pel as described above.

Likewise, if the print output is 2,400 dpi and the linearity correction table 528 is set up for 600 dpi resolution of correction, then the insertion rate divisor 529 is programmed to update the counter 526 for every four Pel clock pulses. Correspondingly, the insertion rate divisor 529 will signal the Pel clock generator 520 via the first output 533 when an insertion is to occur as described above. Referring back to the timing diagram of FIG. 6, it can be seen that an insertion rate signal 410, corresponding to the first output 533 in FIG. 9, goes active (high) each time a slice insertion occurs. As such, the linearity profile can be scaled to any desired print resolution. It is understood that other division rates may be implemented and that other schemes may be implemented to determine how the correction values stored in the linearity correction table 528 are to be distributed across a given scan line.

Algorithm for Building the Linearity Profile

Scan line nonlinearity can be compensated for by adjusting the number of slice clock insertions that are performed when writing Pels across a scan line. The slice clock insertions can be distributed across a corresponding scan line in any manner to derive a more linear scan line. Additionally, slice clock insertions can be used to adjust the length of a line, which affects a margin adjustment registration setting. Essentially, increasing the number of slice clock insertions performed by the linearity correction hardware as described above lengthens a scan line. Correspondingly, decreasing the number of slice clock insertions performed by the linearity correction hardware shortens a scan line. To implement slice clock insertions, data related to slice clock insertions and their corresponding Pel locations are stored in a linearity table 528. The values stored in the linearity table 528 are determined from a linearity profile.

Figure 10:
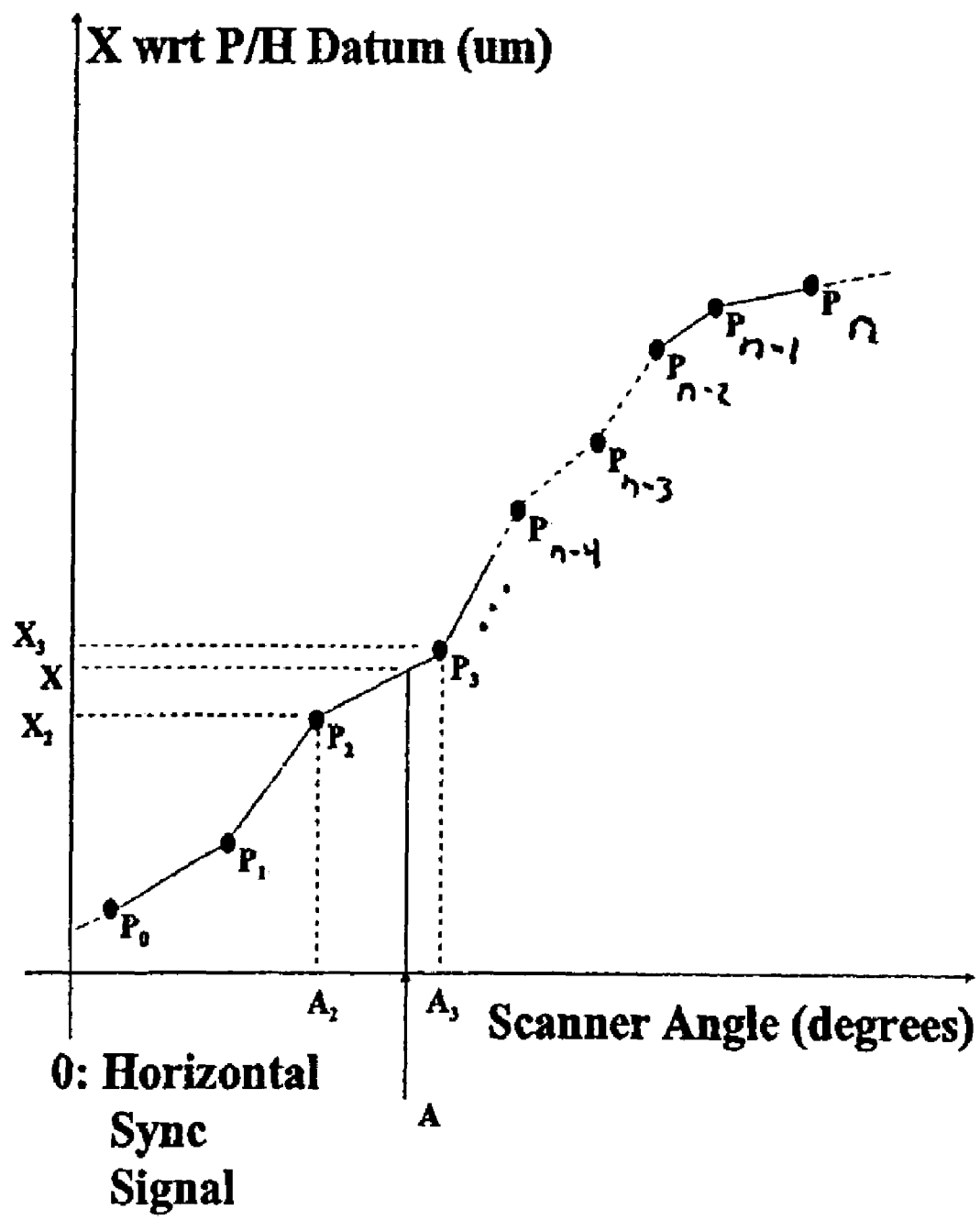
FIG. 10 is a chart plotting laser beam scan direction position as a function of rotating polygonal mirror angle.

The scan direction position of an arbitrary laser beam point $P_j$ along a scan path of an associated laser beam can be described by both its scan direction distance measurement $X_j$, and its corresponding polygonal mirror angle $A_j$. This observation is useful for characterizing linearity corrections. Referring to FIG. 10, the test data points in each laser beam scan path model, e.g., $P_0$-$P_{14}$ as modified per any second margin adjustment, are plotted on a graph illustrating the scan direction position measurements (x_vector_wrt_printhead $[k]_{rotated}$) on the Y-axis. The corresponding polygonal mirror angles A (in degrees) Angle[k] are plotted on the X axis. Each of the points are connected by straight lines thus approximating the general shape of the laser beam scan path model by a series of piecewise linear segments. Accordingly, linear interpolation techniques can be used to derive information about any point along the laser beam scan path by extracting data along a corresponding linear segment. However, more sophisticated curve fitting techniques may alternatively be used depending upon the desired precision of the linearity correction required.

As an example, assume that an angle A is known and the corresponding X value is to be determined. The angle measurements are read from the corresponding Angle[ ] array to find the closest data points that bound the angle A. In the illustrated example, the angle A is bound by Angle[2] corresponding to test point $P_2$ and Angle[3] corresponding to test point $P_3$. Any standard techniques may then be implemented for determining the value of X by fitting to the curve between points $P_2$ and $P_3$. The particular approach will depend largely upon the curve fitting algorithm implemented to connect the bounding data points. For example, if a linear interpolation is used to approximate the laser beam scan path, then the equation of the line segment connecting the bounding data points, Angle[2] and Angle[3] in the above example, is written, and the corresponding location of X is computed. The linear interpolation expression can be generalized as:

$$X=(A-\text{lower bound beam angle})/(\text{upper bound beam angle}-\text{lower bound beam angle})*(\text{upper bound } X \text{ position}-\text{lower bound } X \text{ position})+\text{lower bound } X \text{ position}$$

If a given angle is not between two data points, e.g., $P_0$-$P_{14}$, then the desired values can be extrapolated using the closest linear segment.

The linearity profile is built by working across the scan line. An accumulated angle is built based upon previous selections of the linearity profile. At each decision point, two position errors are computed. A first error assumes that the registration hardware processes an output 538 from the linearity table 528 having the value of 0. A second error is computed, which assumes that the registration hardware processes an output 530 from the linearity table 528 having the value 1. A choice is made whether to store a one or a zero for that Pel location in the linearity profile based on the minimum error. The new accumulated angle is updated based on the selection.

Figure 11:
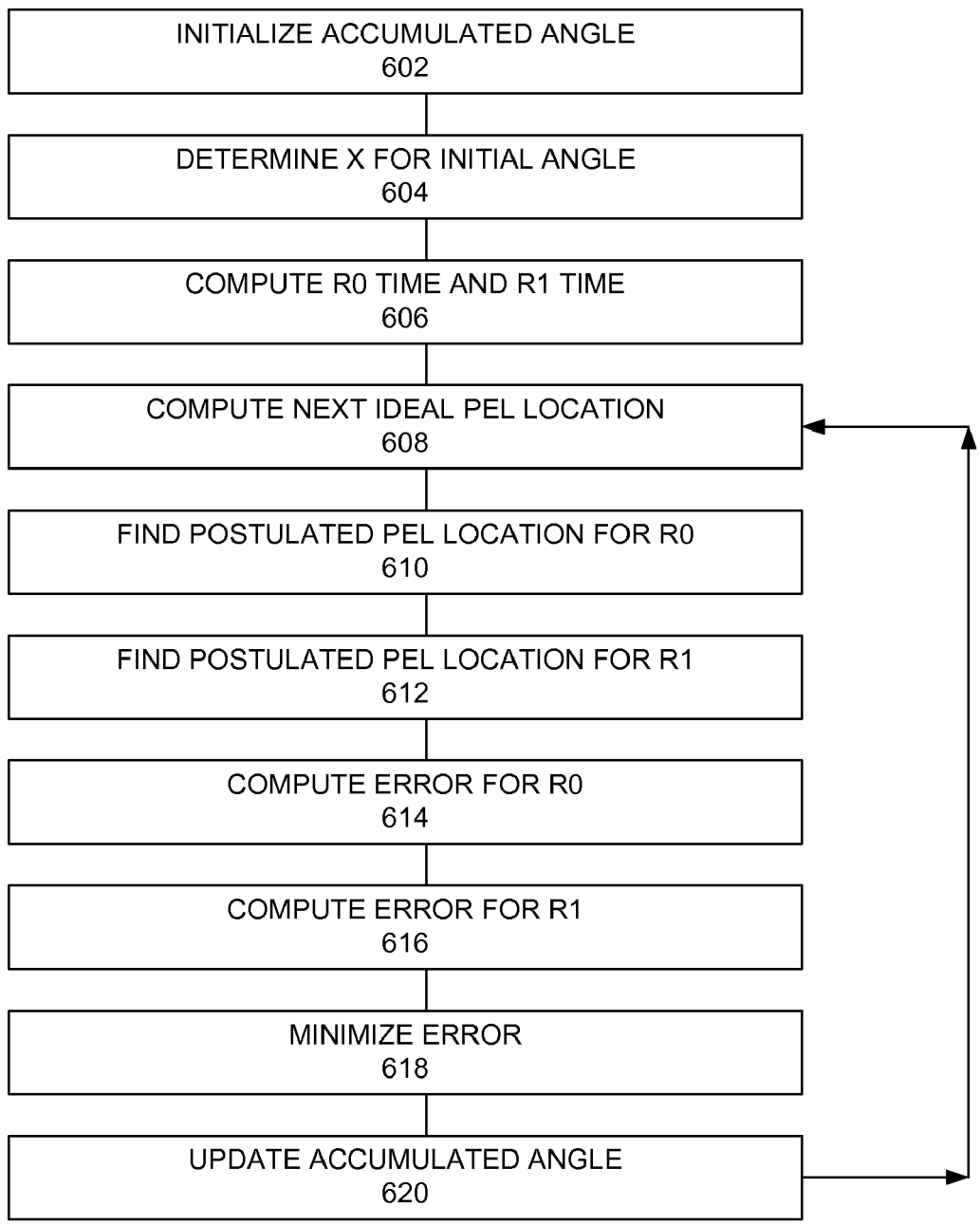
FIG. 11 is a flow chart of an algorithm for generating a linearity profile according to the present invention.

Referring to FIG. 11, a flow chart illustrates an approach for building the linearity profile. The first step is to initialize the accumulated angle at 602. The initial angle in the above exemplary system, corresponding to the location of Pel 0 for the corresponding scan plane, may be derived by taking the detect to print time DTPtime$_{(nominal+offset)}$ in the detect-to-print register 532 divided by the motor velocity (in seconds per degree). This simplifies to:

accumulated_angle=$DTP$time$_{(nominal+offset)}$/Motor Velocity (seconds per degree)

With the starting accumulated angle computed, the associated starting X position (initial scan direction position, i.e., corresponding X-value in the scan direction for Pel 0) is computed at 604, such as by using linear interpolation as set out in greater detail above with reference to FIG. 10. The original X location may also be stored for computing future ideal Pel locations.

The time corresponding to each of the first and second count registers 522 is computed at 606. Keeping with the above example, assume that the first count register in the Pel clock generator 520 is set to a delay of zero slice clock pulses, the second count register in the Pel clock generator 520 is set to a delay of two slice clock pulses and the nominal number of slices per Pel is six, i.e., N=6. The first insertion time $R0_{(time)}$ is defined by the nominal number of slices per Pel plus the number of slices represented by the value stored in the first register R0, multiplied by the slice time, e.g., (N+R0) multiplied by the slice time. Correspondingly, the second insertion time $R1_{(time)}$ is the sum of the nominal number of slice clock pulses plus the number of slices represented by the value stored in the second register R1, multiplied by the slice time, e.g., (N+R1) multiplied by the slice time. Accordingly, the first insertion time $R0_{(time)}$ is 6*slice time and the second insertion time $R1_{(time)}$ is 8*slice time.

The desired resolution, e.g., in Pels, is also determined for the linearity profile. The resolution provides an indication of the spacing that would exist between theoretical ideal Pels along a scan line at that resolution. As an example, assume that the linearity profile is to be constructed for a 600 dpi resolution. One Pel as measured in microns at 600 dpi is 1/600 inch*25.4 mm/in*1000 microns/mm=42.3333 microns. As such, under ideal circumstances, each Pel in a 600 dpi scan line should be printed every 42.3333 microns.

With the above-determined parameters, the system processes through each Pel location corresponding to the desired resolution of the linearity correction data. The ideal next Pel position is determined at 608. The desired scan direction position for the black or yellow scan plane Pels is defined as the starting X position (corresponding to the scan direction location of Pel 0 for the associated scan plane)+(Current Pel location*42.3333). Correspondingly, the desired X location for the cyan or magenta scan plane Pels is the starting X position (corresponding to the scan direction location of Pel 0 for the associated scan plane)−(Pel location*42.3333). Recall that the scan direction for the black and yellow scan planes is generally opposite that for the cyan and magenta scan planes. Accordingly, the desired scan direction location must account for the differences in scan direction depending upon whether the current linearity profile is associated with the one of the black/yellow image planes, or one of the cyan/magenta image planes.

Next, a determination is made as to the error in the computed X position of a written Pel if the Pel clock timing is based upon a linearity correction value selecting the first count register value at 610. This postulated value is computed by computing an angle corresponding to a first postulated angle and converting that first postulated angle into a first postulated position, i.e., scan direction position measurement. The first postulated angle is given by:

$R0_{(Angle)}$=accumulated_angle+($R0_{(Time)}$*polygonal mirror angular velocity)

Given the first postulated angle $R0_{(Angle)}$, the corresponding first postulated position (corresponding scan direction value) is determined, such as using interpolation, extrapolation or other functions based upon the corresponding laser beam position measurements as plotted in FIG. 10. That is, with the first postulated angle $R0_{(Angle)}$ computed, a search is conducted of the corresponding beam position measurements $P_0$-$P_{14}$ for an associated laser beam to find the two test points having beam angle measurements that bound the first postulated angle $R0_{(Angle)}$. An assumption is then made that the X position of the beam is linear with respect to a beam angle between the upper and lower bounds. The first postulated position is then found through interpolation by the following formula:

$R0_{(X position)}$=($R0_{(Angle)}$−lower bound beam angle)/ (upper bound beam angle−lower bound beam angle)*(upper bound $X$ position−lower bound $X$ position)+lower bound $X$ position It is possible depending upon the selection of the location for the test points that the location of the first postulated angle $R0_{(Angle)}$ does not fall between any two test points. Under these circumstances, the first postulated position $R0_{(X position)}$ corresponding to the first postulated angle $R0_{(Angle)}$ can be extrapolated from the slope of a line achieved by connecting the two closest test points.

The above procedure is repeated for the second count register at 612. That is, the second postulated angle Angle with respect to the second count register value is computed as:

$R1_{(Angle)}$=accumulated_angle+($R1_{(Time)}$*Polygonal mirror velocity)

Given the second postulated angle $R1_{(Angle)}$, the corresponding second postulated position (scan direction value $R1_{(X position)}$) is determined using interpolation (extrapolation or other techniques may alternatively be used) based upon the corresponding laser beam position measurements as plotted in FIG. 10.

Figure 12:
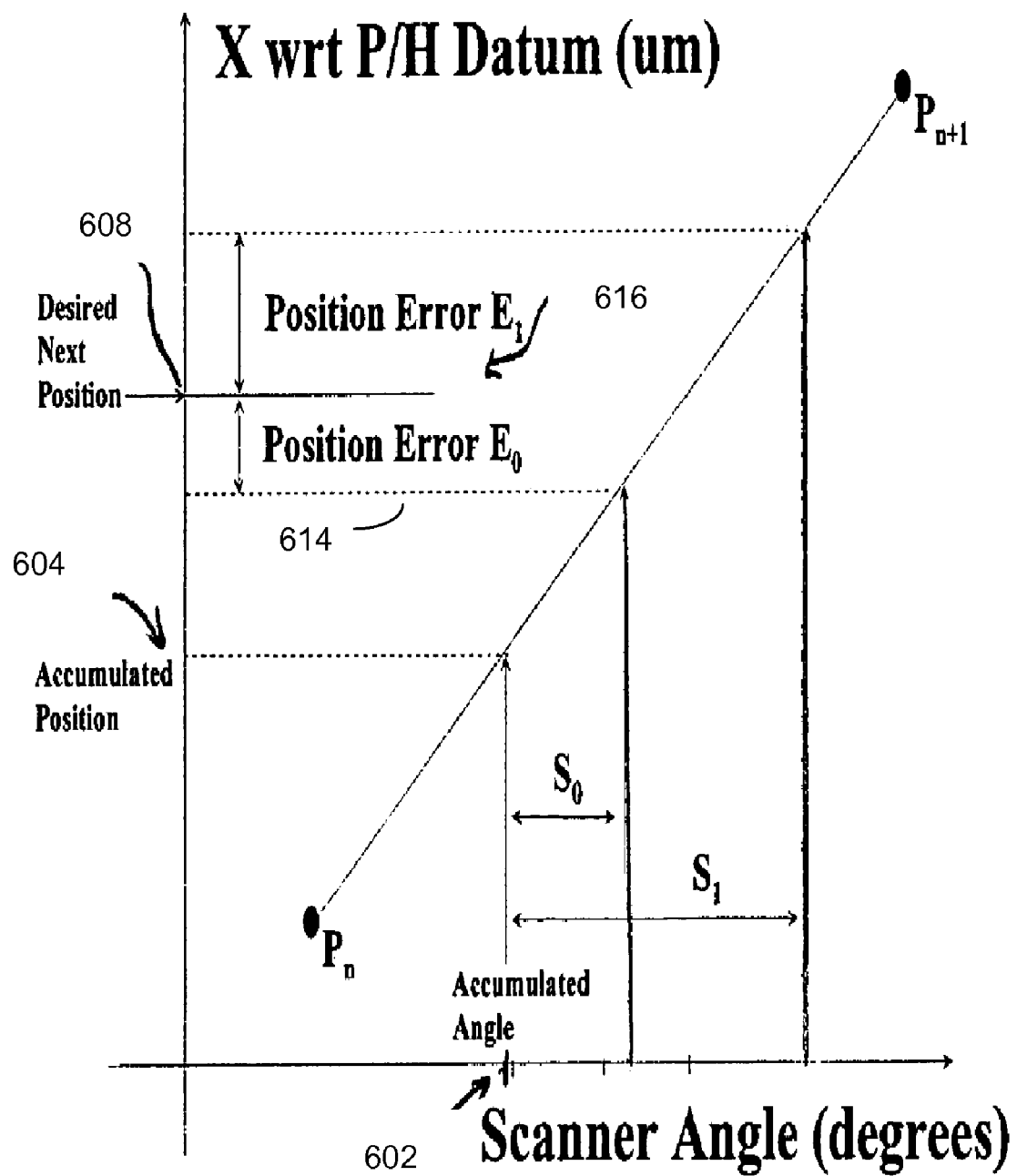
FIG. 12 is a chart illustrating the computation of error for determining the selection of a slice insertion register for a given Pel location along a scan line.

Based upon the above set of computations, two choices are available for selection of the Pel placement correction value. Accordingly, the correction value determines whether a corresponding Pel clock at that Pel location should be based upon the first insertion time $R0_{(Time)}$, i.e, the register R0 or the second insertion time $R1_{(Time)}$, i.e., the register R1. The selection between the fist and second insertion time is chosen that minimizes the absolute error relative to the ideal pel location computed at 608. The error corresponding to the postulated Pel location for R0 is computed at 614 and the error corresponding to the postulated Pel location for R1 is computed at 616. These measurements are summarized on the corresponding plot in FIG. 12.

Error $E0$=|(Desired $X$ Location−$R0_{(X position)}$)|;

Error $E1$=|(Desired $X$ Location−$R1_{(X position)}$)|;

If the error corresponding to register R0 is greater, i.e., Error E0>Error E1 then the linearity profile for the current Pel location is set to 1 at 618, and the accumulated angle value is updated to the second postulated angle R1$_{(Angle)}$ at 620. Similarly, if the position error is greater when using the value in the second count register R1, the current linearity profile value is set to 0 at 618 and the accumulated angle is updated to the first postulated angle R0$_{(Angle)}$ at 620. The linearity profile is stored in the linearity correction table 528 in the corresponding registration system 500 as illustrated in FIG. 9.

Having described the invention in detail and by reference to preferred embodiments thereof, it will be apparent that modifications and variations are possible without departing from the scope of the invention defined in the appended claims.

What is claimed is:

1. A method of computing a linearity profile to compensate for scan line velocity nonlinearity in an electrophotographic device comprising:
   obtaining a plurality of laser beam position measurements;
   assigning a first insertion time;
   assigning a second insertion time; and
   performing for a plurality of Pel locations along a laser beam scan path:
      determining an ideal Pel location based upon a desired correction resolution;
      computing a first postulated position based upon said first insertion time and select ones of said plurality of measurements;
      computing a second postulated position based upon said second insertion time and select ones of said plurality of measurements; and
      storing a correction value corresponding to a select one of said first and second postulated positions that is closest to said ideal Pel location.

2. The method according to claim 1, wherein said plurality of laser beam position measurements comprise a plurality of test points that measure for each test point, a scan direction position and a corresponding time value.

3. The method according to claim 2, wherein each corresponding time value is expressed as a function of an angle of a rotating polygonal mirror in a corresponding printhead.

4. The method according to claim 3, wherein:
   said first postulated position is computed based upon a rotational velocity of said rotating polygonal mirror and said first insertion time to derive a first postulated angle;
   said second postulated position is computed based upon said rotational velocity of said rotating polygonal mirror and said second insertion time to derive a second postulated angle; and
   for each of said first and second postulated angles:
      identifying an upper bound as a select one of said plurality of test points having an angle greater than said corresponding first or second postulated angle;
      identifying a lower bound as a select one of said plurality of test points having an angle less than said first or second postulated angle; and
      interpolating said corresponding first or second postulated position based upon said associated upper and lower bounds.

5. The method according to claim 4, wherein said interpolation comprises a linear interpolation.

6. The method according to claim 4, wherein said upper bound is a select one of said plurality of test points having an angle closest to and greater than said corresponding first or second postulated angle and said lower bound is a select one of said plurality of test points having an angle closest to and less than said corresponding first or second postulated angle.

7. The method according to claim 4, further comprising an accumulated angle, wherein said accumulated angle is initialized to a starting angle and is updated by adding to said accumulated angle, a select one of said first and second postulated angles corresponding to said first and second postulated positions that is closest to said ideal Pel location.

8. The method according to claim 3, wherein said plurality of laser beam position measurements are modified based upon registration data.

9. The method according to claim 8, wherein said registration data comprises a margin adjustment, said margin adjustment computed by rotating said laser beam position measurements such that each scan direction measurement is modified and corresponding ones of said angle measurements are unchanged.

10. The method according to claim 1, wherein a select one of said first and second postulated positions is chosen as being closest to said ideal Pel location by:
    computing an absolute error of said first postulated position relative to said ideal Pel location;
    computing an absolute error of said second postulated position relative to said ideal Pel location; and
    choosing a select one of said first and second postulated positions with the smallest absolute error.

11. The method according to claim 1, wherein said ideal Pel location is based upon previously accumulated ideal Pel location position.

12. The method according to claim 11, wherein said ideal Pel location is based upon an initial ideal Pel location corresponding to a location of a first written Pel associated with a printed page.

13. The method according to claim 1, wherein said first and second insertion times each correspond to a respective offset from a nominal value.

14. The method according to claim 1, wherein said correction value indicates whether a Pel clock should be based upon said first insertion time or said second insertion time.

15. The method according to claim 1, wherein a print resolution is different from said desired correction resolution, and said linearity profile is scaled to said print resolution.

16. A method of computing a linearity profile to compensate for scan line velocity nonlinearity in an electrophotographic device comprising:
    obtaining a plurality of laser beam position measurement comprising a plurality of test points that measure for each test point, a scan direction position and a corresponding time value;
    initializing an accumulated angle;
    computing an initial scan direction position based upon said starting accumulated angle;
    assigning a first insertion time;
    assigning a second insertion time; and
    performing for a plurality of Pel locations along a laser beam scan path:
       determining an ideal scan direction Pel location based upon a predetermined correction resolution;
       computing a first postulated angle based upon said first insertion time and said accumulated angle;
       converting said first postulated angle to a first postulated position based upon select ones of said plurality of measurements;
       computing a second postulated angle based upon said second insertion time and said accumulated angle;
       converting said second postulated angle to a second postulated position based upon select ones of said plurality of measurements;

comparing said ideal scan direction Pel location to said first and second postulated positions;

storing a correction value corresponding to a select one of said first and second postulated positions that is minimizes an error computation relative to said ideal scan direction Pel location; and updating said accumulated angle to said first postulated angle if said first postulated position results in less error than said second postulated position, and updating said accumulated angle to said second postulated angle if said second postulated position results in less error than said first postulated position.

17. The method according to claim 16, wherein said starting accumulated angle is determined based upon a predetermined time from detecting a start of scan signal.

18. The method according to claim 16, wherein said starting accumulated angle is based upon a nominally stored value and an offset value.

19. The method according to claim 18, wherein said starting accumulated angle is computed based upon a motor velocity of a rotating polygonal mirror.

20. The method according to claim 16, wherein a correction value is computed for every writable Pel location based upon said correction resolution.

21. A laser beam scan line velocity linearity registration system comprising:
a slice clock operatively configured to output slice clock pulses having a fixed frequency;
a pel clock generator programmably configured to generate pel clock pulses based upon said slice clock pulses and correction values input thereto;
a pel clock counter communicably coupled to said pel clock generator, said pel clock counter operatively configured to determine a count value corresponding to a count of pel clock pulses;
a linearity table having stored therein, a plurality of correction values, said linearity table communicably coupled to said pel clock counter and said pel clock generator such that an associated one of said correction values is selected from said linearity table based upon said count value from said pel clock counter and is communicated to said pel clock generator, wherein a duration of a corresponding pel clock pulse is determined from said correction value; and
a video unit arranged to communicate Pels to a corresponding laser beam, said video unit coupled to said slice clock and said pel clock generator, wherein a duration of each Pel is determined by said slice clock, and spacing between Pels is determined by said pel clock generator.

22. The system according to claim 21, wherein said pel clock counter is reset before each scan line write of a corresponding laser beam.

23. The system according to claim 21, wherein the duration of each pel comprises at least one slice clock pulse.

24. The system according to claim 21, wherein said pel clock generator corresponds each correction value supplied from said linearity table thereto, to an associated number of slice clock pulses to derive a corresponding pel clock pulse.

25. The system according to claim 21, further comprising:
a first count register having stored therein, a first count value; and
a second count register having stored therein, a second count value, wherein each correction value from said linearity table is used to select between said first and second count registers, which are used to determine the number of slice clock pulses in a corresponding pel clock pulse.

26. The system according to claim 25, wherein each of said first and second count values define an offset from a base slice clock pulse count.

27. The system according to claim 26, wherein said pel clock generator generates a pel clock pulse at a nominal rate when no correction value is communicated from said linearity table, and said pel clock generator generates a pel clock pulse based upon said nominal rate and a select one of said first and second count values when a correction value is communicated from said linearity table.

28. The system according to claim 25, wherein each correction value in said linearity table comprises a one-bit value that is used to select either said first or second count registers.

29. The system according to claim 28, wherein said predetermined number is modified by a random value at the start of each scan line.

30. The system according to claim 21, wherein a first pel clock pulse for a given scan line occurs at a predetermined number of slice clock pulses after a start of scan signal is detected.

31. The system according to claim 21, further comprising an insertion rate divisor between said pel clock generator and said pel clock counter, configured to update said pel clock counter based upon integer multiples of pel clock pulses.

32. The system according to claim 21, wherein said correction values are stored in said linearity table based upon a predetermined resolution of printing, wherein said pel clock counter compensates for relatively higher print resolutions by modifying when said count value is updated.

* * * * *

UNITED STATES PATENT AND TRADEMARK OFFICE
CERTIFICATE OF CORRECTION

PATENT NO. : 7,639,407 B2  Page 1 of 1
APPLICATION NO. : 10/808130
DATED : December 29, 2009
INVENTOR(S) : Clarke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1578 days.

Signed and Sealed this

Twenty-first Day of December, 2010

David J. Kappos
*Director of the United States Patent and Trademark Office*